(12) United States Patent
Choi et al.

(10) Patent No.: US 9,016,884 B2
(45) Date of Patent: Apr. 28, 2015

(54) POLARIZATION ILLUMINATION SYSTEM

(76) Inventors: Uk Choi, Seoul (KR); Ju Won Kim, Seoul (KR)

( * ) Notice: Subject to any disclaimer, the term of this patent is extended or adjusted under 35 U.S.C. 154(b) by 83 days.

(21) Appl. No.: 13/989,210

(22) PCT Filed: Nov. 25, 2011

(86) PCT No.: PCT/KR2011/009054
§ 371 (c)(1),
(2), (4) Date: May 23, 2013

(87) PCT Pub. No.: WO2012/070904
PCT Pub. Date: May 31, 2012

(65) Prior Publication Data
US 2013/0242528 A1    Sep. 19, 2013

(30) Foreign Application Priority Data

Nov. 25, 2010  (KR) .................. 10-2010-0017952
Apr. 8, 2011   (KR) .................. 10-2011-0032626
Apr. 28, 2011  (KR) .................. 10-2011-0039994
Aug. 31, 2011  (KR) .................. 10-2011-0087761

(51) Int. Cl.
*F21V 9/14*   (2006.01)
*G02B 27/28*  (2006.01)

(52) U.S. Cl.
CPC .. *F21V 9/14* (2013.01); *G02B 27/28* (2013.01)

(58) Field of Classification Search
USPC ........................................... 362/19, 607–609
See application file for complete search history.

(56) References Cited

U.S. PATENT DOCUMENTS

| 7,201,510 | B2 |   | 4/2007  | Yamashita et al. |
| 7,357,511 | B2 | * | 4/2008  | Aastuen et al. ................ 353/20 |
| 7,742,169 | B2 |   | 6/2010  | Morita |
| 2008/0304282 | A1 | * | 12/2008 | Mi et al. ..................... 362/607 |
| 2010/0165660 | A1 | * | 7/2010  | Weber et al. ................. 362/609 |

FOREIGN PATENT DOCUMENTS

| JP | 5062504 A      | 3/1993 |
| JP | 2003241193 A   | 8/2003 |
| JP | 2005-338652 A  | 12/2005 |
| JP | 2008-15019 A   | 1/2008 |
| KR | 10-1999-0075707 A | 10/1999 |
| KR | 10-2005-0042145 | 5/2005 |

OTHER PUBLICATIONS

Korean Office Action for KR10-2011-0032626 with partial English translation.
International Search Report for PCT/KR2011/009054, dated Aug. 3, 2012.

* cited by examiner

*Primary Examiner* — Mary Ellen Bowman
(74) *Attorney, Agent, or Firm* — Bachman & LaPointe, P.C.

(57) ABSTRACT

A polarization illumination system 1000a according to the first invention of the present patent application includes an illumination means having light source means 8, polarizing means 10 for receiving and polarizing light emitted from the light source means, a birefringence medium 20 for receiving and double refracting the light emitted from the light source means and transmitted through the polarizing means. Illumination space S to which the light of the illumination means is illuminated has a polarized reflection object 60 that reflects an incident light in a way that the reflected light partly or fully polarized.

13 Claims, 31 Drawing Sheets

FIG. 2
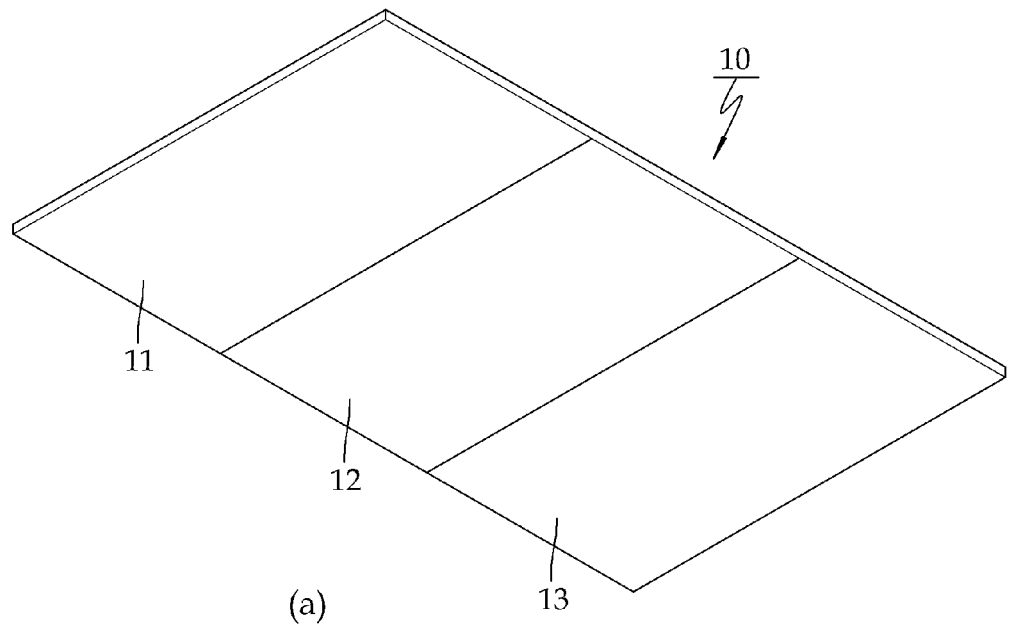
(a)
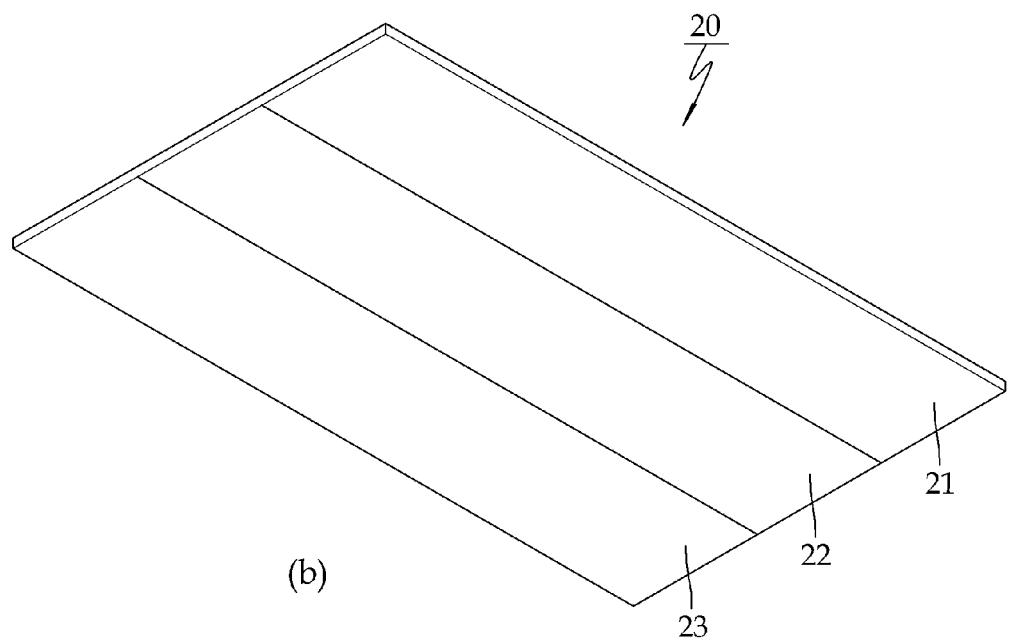
(b)

FIG. 20
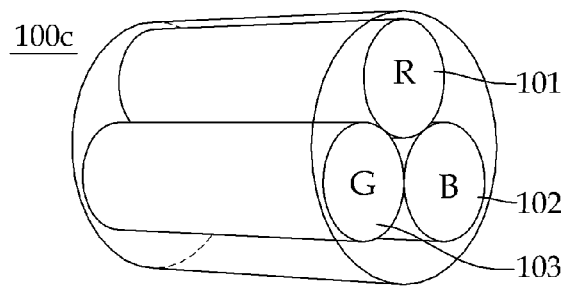
(a)
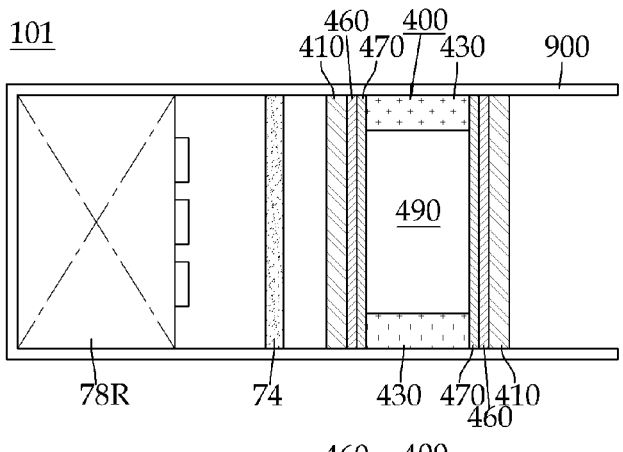
(b)
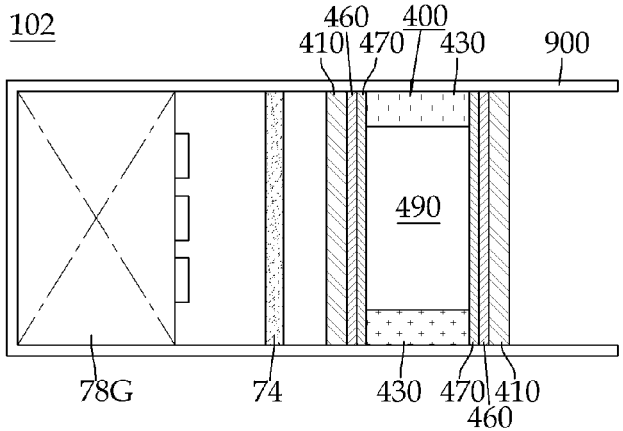
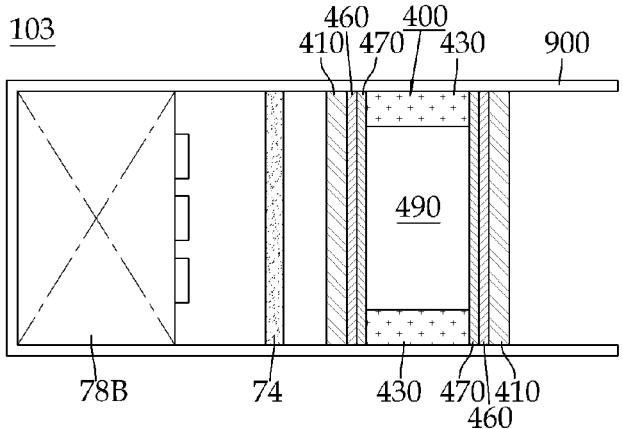

POLARIZATION ILLUMINATION SYSTEM

BACKGROUND

The present invention relates to a polarization illumination system, and more particularly, to the polarization illumination system where reflected light is colored by means of a polarized light.

Polarization refers to the phenomenon that the direction of the electric field is constant in the plane perpendicular to a travel direction of light. The typical example of the polarization is that two polarizers eliminate the light if their transmission directions are placed at right angles.

By using this polarization, through a polarization film etc, the light can be polarized to the constant direction.

The present applicants have researched the polarization and have filed a number of display device and illumination system and their application numbers and titles are as follows.

Korean Patent Application No. 10-2010-0072201 Polarization display device;

Korean Patent Application No. 10-2010-0088893 Polarization display device;

Korean Patent Application No. 10-2010-0091423 Polarization display device;

Korean Patent Application No. 10-2010-0117952 Polarization illumination device to reflection objects;

Korean Patent Application No. 10-2010-0117956 Polarization display device where the polarization direction changes by means of liquid crystal device;

Korean Patent Application No. 10-2011-0003062 Polarization display device;

Korean Patent Application No. 10-2011-0032626 Polarization illumination device;

Korean Patent Application No. 10-2011-0039994 Polarization reflection illumination system;

Korean Patent Application No. 10-2011-0048592 Polarization illumination table;

Korean Patent Application No. 10-2011-0063584 Polarization display device where the color is differently seen according to the viewing position;

Korean Patent Application No. 10-2011-0074013 Polarization display device (the application claiming priority to Korean Patent Application Nos. 10-2010-0072201, 10-2010-0088893, 10-2011-0003062, 10-2010-0117956 and 10-2010-0091423 among the above applications); International Patent Application No. PCT/KR2011/005501 Polarization display device (the PCT application claiming priority to Korean Patent Application Nos. 10-2010-0072201, 10-2010-0088893, 10-2011-0003062, 10-2010-0117956 and 10-2010-0091423 among the above applications); and Korean Patent Application No. 10-2011-0087761 Polarization illumination system.

If light travels in air (or in vacuum or in liquid) and some part of the light is transmitted into a medium with refraction and other part of the light is reflected at the boundary of the medium, the reflected light is partly or fully polarized according to the angle thereof. The medium causing the polarization by the reflection as such is the material such as glass, acryl, liquid like water, plastic, crystal and transparent paint etc. where the light is partly transmitted to and partly reflected at the surface.

The illumination device such as a chandelier has reflective ornamental things. Mirror ball has a plurality of reflective members such as mirrors coved on its surface. A light source illuminates it and the light is reflected at the reflective members. By this illumination effect is achieved. If the mirror ball or the light source rotates, the unique illumination effect is possible.

SUMMARY OF THE INVENTION

The present invention provides a polarization illumination system and a method where, with respect to a polarized reflection object that reflects incident light and makes the reflected light partly or fully polarized, an illumination device such as a chandelier having reflective ornamental things and an illumination object such as the mirror ball having the reflective members such as the mirror on its surface, the white light that does not cause any visual disturbance is discharged, the reflected light has color and the color is changeable.

The purpose of the present invention is to provide a polarization illumination system and a method where, with respect to a polarized reflection object that reflects incident light in a way that the reflected light partly or fully polarized, an illumination device such as a chandelier having reflective ornamental things and an illumination object such as the mirror ball having the reflective members such as the mirror on its surface, the white light that does not cause any visual disturbance is discharged and the reflected light has color and the color is changeable.

The first invention of this application provides a polarization illumination system comprising: light source means; polarizing means for receiving and polarizing light emitted from the light source means; a birefringence medium for receiving and double refracting the light emitted from the light source means and transmitted through the polarizing means; a polarized reflection object that reflects an incident light in a way that the reflected light partly or fully polarized to which the light emitted from the light source means and transmitted through the polarizing means and the birefringence medium.

According to the embodiment of the first invention, the polarizing means and the birefringence medium are stacked up each other.

According to the embodiment of the first invention, the birefringence medium is attached to the front surface of the polarizing means.

According to the embodiment of the first invention, the polarizing means has a plurality of polarizing zones wherein polarization directions of the polarizing zones are different.

According to the embodiment of the first invention, the birefringence medium has a plurality of birefringence zones wherein birefringence characteristics of the birefringence medium are different.

According to the embodiment of the first invention, the birefringence medium has a plurality of birefringence zones wherein birefringence characteristics of the birefringence medium are different.

According to the embodiment of the first invention, the light source means includes a surface light source.

According to the embodiment of the first invention, the light source means has a light source and a light guide plate receiving the light from the light source and emitting the received light.

According to the embodiment of the first invention, the light source of the light source means is a LED lamp or a cold cathode fluorescent lamp.

According to the embodiment of the first invention, the polarized reflection object is made of liquid, glass, acryl, crystal or plastic.

The first invention of this application also provides an illumination means for illuminating a polarized reflection object which reflects light in a way that the reflected light is fully or partly polarized comprising: light source means; polarizing means for polarizing light emitted from the light source means; a birefringence medium for double refracting the light emitted from the light source means and transmitted through the polarizing means.

The first invention of this application also provides an polarization illumination system comprising: an illumination means having a plurality of light sources each emitting different colored light and polarizing means each provided in the respective light sources; wherein polarization directions of the polarizing means provided in the respective light sources are different, a polarized reflection object that reflects an incident light in a way that the reflected light partly or fully polarized to which the light emitted from the illumination means is incident.

In this case, the illumination means has a plurality of zones where polarization directions of the polarizing means of the light sources emitting the same colored lights are the same in the same zone and are different in the another zone.

The first invention of this application further provides an illumination means for illuminating a polarized reflection object provided in an illumination space which reflects light in a way that the reflected light is polarized comprising: a plurality of light sources each emitting different colored light; polarizing means each provided in the respective light sources wherein polarization directions of the polarizing means provided in the respective light sources are different.

In this case, the illumination means has a plurality of zones where polarization directions of the polarizing means of the light sources emitting the same colored lights are the same in the same zone and are different in the another zone.

The first invention of this application further provides an illumination means for illuminating an illumination object having a polarized reflection object provided in an illumination space which reflects light in a way that the reflected light is fully or partly polarized and a birefringence medium arranged on the polarized reflection object comprising: light sources means; polarizing means for receiving and polarizing light emitted from the light source.

The second invention of this application provides a polarization illumination device for illuminating a polarized reflection object that reflects incident light in a way that the reflected light is fully or partly polarized comprising: a polarized light source emitting a polarized light and illuminating the polarized reflection object; a birefringence medium arranged between the polarized light source and the polarized reflection object; wherein, polarization direction of the light emitted from the polarized light source, the birefringence medium and the polarized reflection objects rotate relative to one another.

According to the second invention, the polarized reflection object is made of liquid, glass, acryl, crystal or plastic.

According to the second invention, the polarization direction of the light emitted from the polarized light source rotates and the birefringence medium and the polarized reflection object are stationary.

According to the second invention, the birefringence medium rotates and the polarized light source and the polarized reflection object are stationary.

According to the second invention, the birefringence medium and the polarized light source rotate integrally or with the same velocity each other and the polarized reflection object is stationary.

According to the second invention, the rotation of the polarization direction of the light emitted from the polarized light source is accomplished by making use of a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes.

According to the second invention, the revolution includes a partial angular rotation or the change of the angle.

According to the second invention, the polarized light source and the birefringence medium are stationary and the polarized reflection object rotates.

The second invention of this application also provides a polarization illumination device for illuminating a polarized reflection object that reflects an incident light in a way that the reflected light is fully or partly polarized comprising: three polarized light sources each emitting red(R), green(G) and blue(B), respectively; wherein, the lights emitted from the three polarized light sources are mixed to produce a white light and the produced white light is illuminated to the polarized reflection object, a part or all of the polarization directions of the three polarized light sources and the polarized reflection object rotate relative to one another.

In this case, the three polarized light sources are light sources each emitting R, G and B wavelength light, respectively and polarizing means each polarizing the light from the light sources, the polarization directions of the R, G and B wavelength lights are changed by means of a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes.

The third invention of this application provides a polarized light reflection illumination system comprising: a reflection object having a reflective member and polarizing means provided on the surface of the reflective member for polarizing an incident light thereto; (b) a polarized light source emitting a polarized light; a birefringence medium arranged between the polarized light source and the polarizing means of the reflection object; wherein the light emitted from the polarized light source and transmitted through the birefringence medium is illuminated to the reflection object. displacement means for changing polarization direction of the light emitted from the polarized light source, a position of point on the birefringence medium and polarization direction of the polarizing means of the reflection object one another.

According to the third invention, the birefringence medium is integrally coupled to the polarized light source.

According to the third invention, the displacement means includes rotation means for polarization direction of the polarized light source that rotates the polarization direction of the polarized light source.

According to the third invention, the displacement means includes rotation means for the birefringence medium that rotates the birefringence medium.

According to the third invention, the displacement means includes rotation means for the reflection object that rotates the reflection object.

According to the third invention, the birefringence medium is attached to the surface of the polarizing means of the reflection object.

According to the third invention, the rotation means for polarization direction of the polarized light source is a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes According to the third invention, the reflective member is provided by one or plurally provided.

According to the third invention, the reflective member is provided with a plurality of the polarizing means and the polarization directions of all the polarizing means or some part of the polarizing means are different.

According to the third invention, the reflection object is a mirror ball.

The third invention of this application also provides a polarized light reflection illumination system comprising: a reflection object having a reflective member and polarizing means provided on the surface of the reflective member for polarizing an incident light thereto; a plurality of polarized light sources each emitting a polarized light and the colors of the emitted lights being different; displacement means for changing respective polarization directions of the lights emitted from the polarized light sources and polarization direction of the polarizing means of the reflection object one another.

According to the third invention, the polarized light sources has a first polarized light source emitting the polarized red (R) light, a second polarized light source emitting the polarized green (G) light and a third polarized light source emitting the polarized blue (B) light.

According to the third invention, the lights emitted from the polarized light sources having the first polarized light source emitting the polarized red (R) light, the second polarized light source emitting the polarized green (G) light and the third polarized light source emitting the polarized blue (B) light are mixed to produce a white light.

In this case, the displacement means is a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes According to the third invention, the reflection object is a mirror ball.

The third invention of this application further provides a polarized light reflection illumination system comprising: a reflection object having a reflective member, polarizing means provided on the surface of the reflective member for polarizing an incident light thereto and a birefringence medium provided on the surface of the birefringence medium; wherein the birefringence medium has a plurality of zones where birefringence characteristics are different, a polarized light source emitting a polarized light; displacement means for changing polarization directions of the light emitted from the polarized light source and a position of point on the birefringence medium relative to each other.

According to the third invention, the displacement means includes rotation means for polarization direction of the polarized light source that rotates the polarization direction of the polarized light source.

According to the third invention, the reflection object is stationary or rotates.

According to the third invention, the reflection object is a mirror ball.

The fourth invention of this application provides a polarization illumination device comprising: an ornamental object that is a medium through which a light is transmitted and has polarizing means; a polarized light source emitting a polarized light; a birefringence medium arranged between the polarized light source and the polarizing means provided in the ornamental object; wherein the light emitted from the polarized light source and transmitted through the birefringence medium is illuminated to the polarizing means provided in the ornamental object, displacement means for changing polarization direction of the light emitted from the polarized light source, a position of a point on the birefringence medium and the polarization direction of the polarizing means provided in the ornamental object one another.

According to the fourth invention, the displacement means rotates the polarization direction of the light emitted from the polarized light source and the birefringence medium and the polarizing means provided in the ornamental object are stationary.

According to the fourth invention, the displacement means rotates the birefringence medium and the polarized light source and the polarizing means provided in the ornamental object are stationary.

According to the fourth invention, the displacement means rotates the birefringence medium and the polarized light source altogether and the polarizing means provided in the ornamental object is stationary.

According to the fourth invention, the displacement means changes the position of a point on the polarizing means provided in the ornamental object.

According to the fourth invention, the displacement means makes the polarizing means rotate.

According to the fourth invention, the displacement means makes the polarizing means turn around along the circumference of the polarized illumination device.

According to the fourth invention, the displacement means is a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes.

According to the fourth invention, the revolution includes a partial angular rotation or the change of the angle.

According to the fourth invention, the displacement means changes the position of a point on the polarizing means provided in the ornamental object.

According to the fourth invention, the birefringence medium is attached to the surface of the polarizing means provided in the ornamental object.

According to the fourth invention, the ornamental object has an embossing or engraving part, a bubble therein or an empty space therein, or the ornamental object is a polyhedron having a plurality of edges.

The fourth invention of this application further provides a polarization illumination device comprising: an ornamental object that is a medium through which a light is transmitted and has polarizing means; a plurality of polarized light sources each emitting a polarized light having a different color; wherein the polarized light sources illuminates the polarizing means provided in the ornamental object, displacement means for changing the respective polarization directions of the polarized light sources and polarization direction of the polarizing means provided in the ornamental object.

According to the fourth invention, the polarized light sources has a first polarized light source emitting the polarized red (R) light, a second polarized light source emitting the polarized green (G) light and a third polarized light source emitting the polarized blue (B) light.

According to the fourth invention, the lights from the first polarized light source to the third polarized light source are mixed to produce a white light.

According to the fourth invention, the displacement means is a liquid crystal device where a spacer is interposed between opposite glass substrates to secure space, liquid crystal is filled in the space, the space is sealed by a sealant, a transparent electrode and a liquid crystal alignment layer are sequentially laminated on the glass substrates and the polarization direction of the light incident to the glass substrate changes when voltage is applied to the transparent electrodes.

According to the first invention of the present application, the polarization illumination system where the polarized light is emitted and the light presenting color is reflected on the polarized reflection object is provided.

According to the first invention, the light discharged from the illumination means is the white light not causing any visual disturbance and the light reflected on the polarized reflection object presents color. If the polarizing means or the birefringence medium has a plurality of the zones where the polarization directions or the birefringence characteristics are different, the different colored lights are reflected according to the zones on the polarized reflection object.

According to the first invention, the color of the reflected light can be viewed differently according to the position of the eyes of the beholder.

Further, the first invention provides the light source means each emitting the different colored light and having the polarizing means. The polarization directions of the polarizing means are different according to the emitting colors of the light source means. Accordingly, the light where the polarization directions are different according to the wavelengths of the respective colors are emitted and the reflected light on the polarized reflection object presents color.

In this case, the light source means have the zones and the polarization directions of the light source means emitting the same colors are different if the zones are different so that the reflected light from the polarized reflection object has the different colors according to the zones.

The second invention of the present application provides the polarization illumination system where unique display that the color is viewed as it changes on the polarized reflection object to which the light is incident by means of the polarization.

In the polarization illumination system according to the second invention, although the light emitted from the light source does not cause any visual disturbance, the color on the polarized reflection object changes.

The third invention of the present application provides the polarized reflection illumination system where the color on the reflection object like the mirror ball changes and, in particular, the respective reflected lights present different colors according to the polarization directions or the birefringence medium characteristics on the surface of the reflection object. In this case, although the color of the light emitted from the light source does not change at all, the color on the reflection object like the mirror ball changes.

The third invention of the present application provides the polarized illumination device where the color on the ornamental objects is viewed as it changes in the illumination device having the ornamental objects such as the chandelier. In this case, the color of the light emitted from the light source of the illumination device does not change at all, however, color change is presented on the ornamental objects.

BRIEF DESCRIPTION OF THE DRAWINGS

FIG. 2 shows that polarizing means or a birefringence medium has a plurality of zones in the first invention;

FIG. 20 shows another example of the polarized light source by R, G and B;

DETAILED DESCRIPTION

The embodiments of the present invention will be explained with reference to the accompanying drawings.

FIGS. 1 to 6 are related to the first invention of the present patent application and they show a polarization illumination system with respect to a polarized reflection object that reflects the incident light and makes the reflected light is partly or fully polarized.

Figure 1:
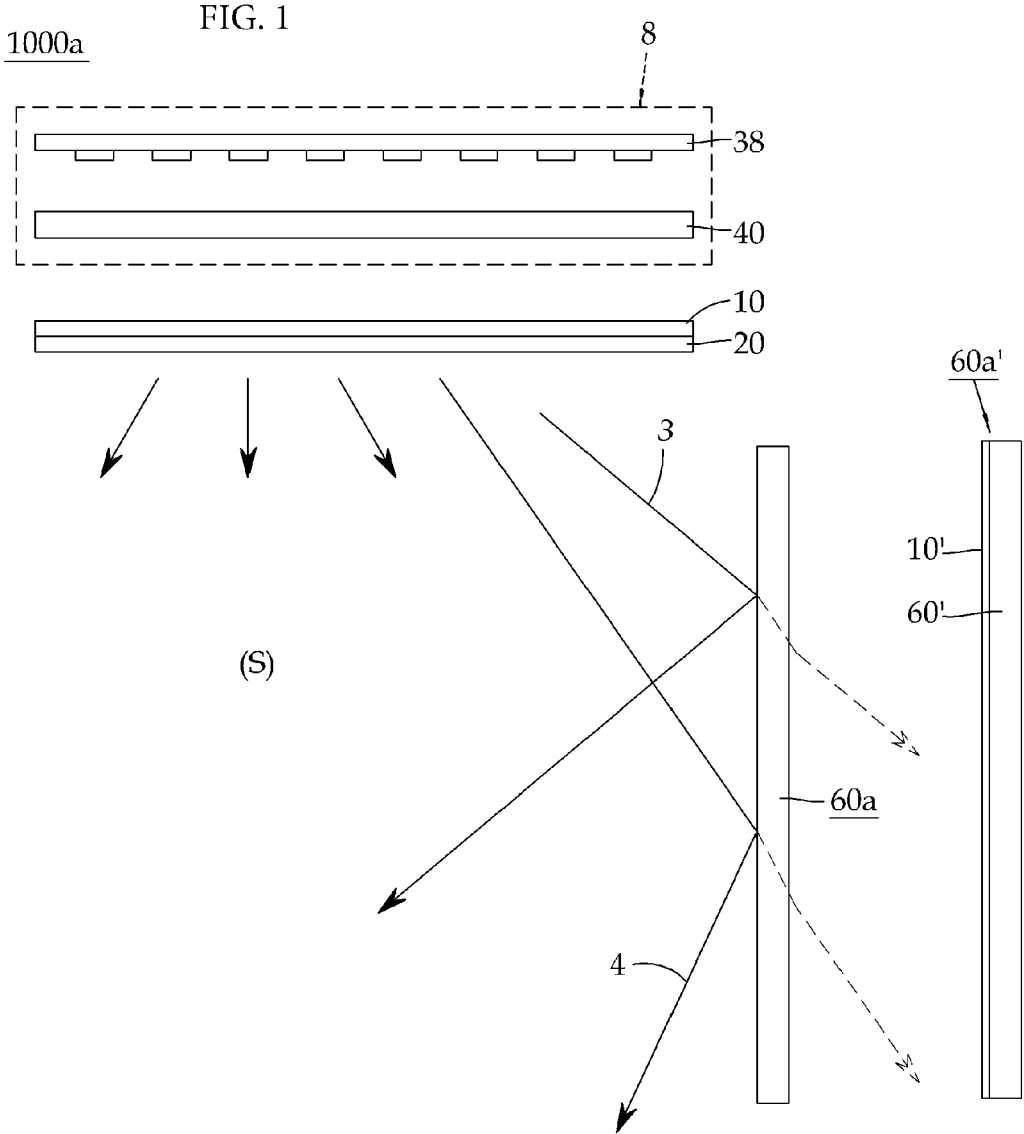
FIG. 1 shows a polarization illumination system according to a first aspect of a first invention.

FIG. 1 shows the polarization illumination system 1000a according to the first aspect of the first invention.

A light source means 8 emitting light is provided and a polarizing means 10 is arranged in front of the light source means 8 and a birefringence medium 20 is arranged in front of the polarizing means 10.

The light emitted from the light source means 8 is transmitted to the polarizing means 10 and, then, transmitted to the birefringence medium 20.

The light source means 8, the polarizing means 10 and the birefringence medium 20 may constitute an illumination means which illuminates a polarized reflection object 60a as described later.

The light source means 8 is to emit the light and includes a light source such as LED lamp, and cold cathode fluorescent lamp (CCFL) and may further include a light guide plate to emit the light uniformly and efficiently.

The polarizing means 10 is to polarize the light and includes polarizing film, polarizing filter and polarizing plate.

The birefringence medium 20 is to double-refract the light. The stretched plastic film such as OPP film or PET film and cellophane film and plastic plate that have the double-refraction property can be used. A birefringence film specially produced for the double-refraction can be used, too. Birefringence plate or birefringence lens can be also used for the birefringence medium.

The polarizing means 10 may be attached to the bottom surface of the light source means 8 and the birefringence medium 20 may be attached to the bottom surface of the polarizing means 10. For example, the polarizing film is attached to the light source means 8 such as the LED lamp and cold cathode fluorescent lamp (CCFL) and the birefringence film is attached to the polarizing film.

The light emitted from the light source means 8 and transmitted through the polarizing means 10 is polarized and, then, is transmitted through the birefringence medium 20.

If the polarized light passes through the birefringence medium, it comes to have the different polarization directions according to the wavelengths. Accordingly, the light emitted from the light source means 8 and passed through the polarizing means 10 and the birefringence medium 20 becomes the light having the different polarization directions according to the wavelengths and discharged to an illumination space S to which the illumination is directed.

In this case, the light discharged to the illumination space S keeps almost the same color of the light emitted from the light source means 8.

Normally, if the white light is emitted from the light source means 8, the light passed through the birefringence medium 20 via the polarizing means 10 keeps the white light so that no visual disturbance problem arises in the illumination space S.

According to the present invention, a polarized reflection object 60a is provided in the illumination space S.

The polarized reflection object 60a is an object that reflects the incident light in a way that the reflected light is fully or partly polarized.

For example, the reflected light from an object that reflects some part of the incident light and transmits some other part of it is fully or partly polarized according to the incident, reflection and refraction angles. Accordingly, any object that reflects some of the incident light and transmits some other part of it made of glass, acryl, crystal or plastic etc can be the polarized reflection object.

In case of the surface of the liquid, it reflects and transmits the incident light and the reflected light is polarized. Accordingly, it can be the polarized reflection object according to the present invention. (For example, water in a container or flowing water etc.)

As such, the polarized reflection object according to the present invention includes all the objects that reflect the light in a way that the reflected light is polarized.

The polarized reflection object 60a can be installed by various positions including vertical and horizontal positions in the illumination space.

Figure 5:
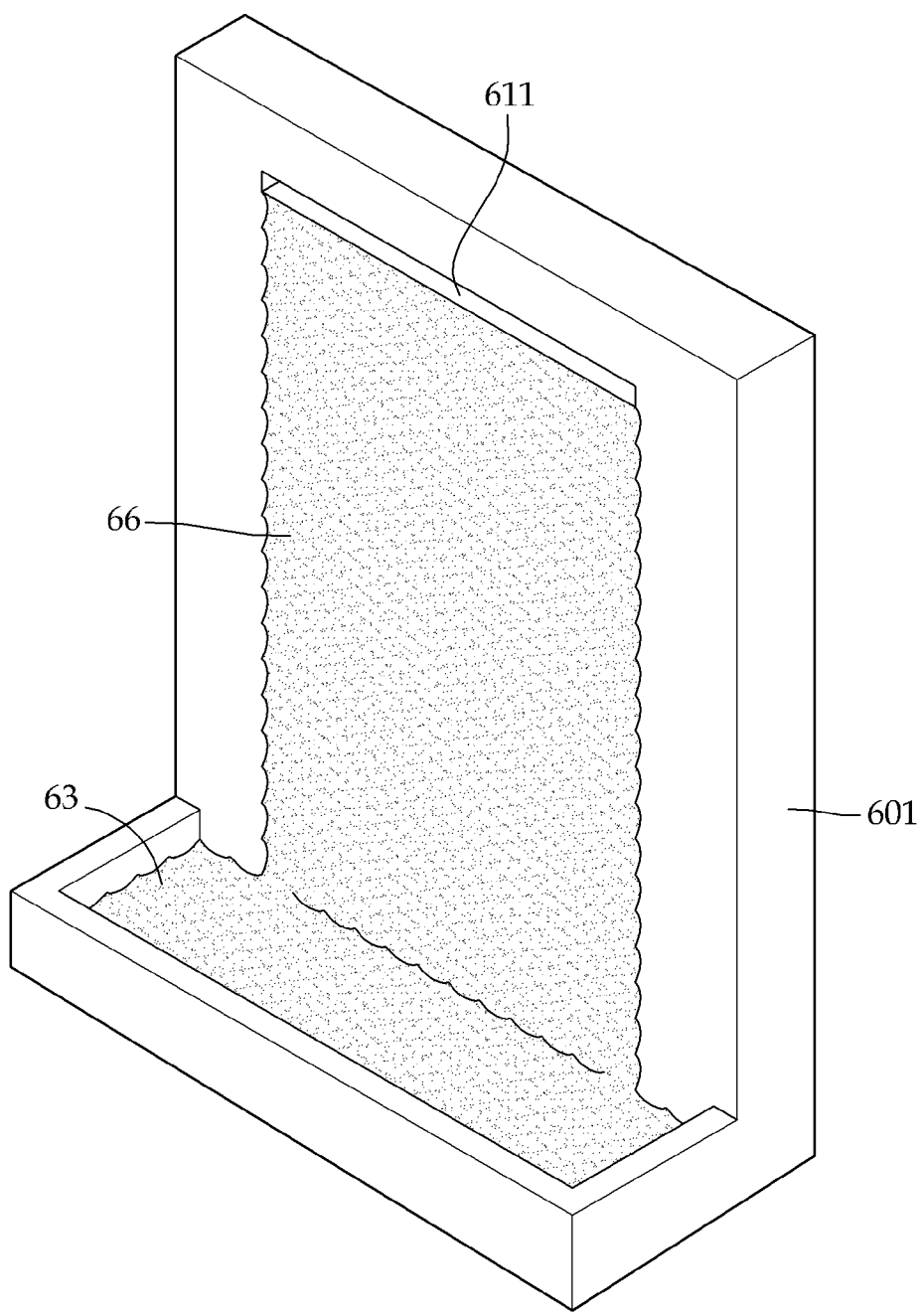
FIG. 5 shows a sculpture in which the water flows as an example of a polarized reflection object.

One example of the polarized reflection object 60a is a sculpture in which the water flows. As shown in FIG. 5, the sculpture in which the water 66 is flowing down from a groove 611 of the vertical plate 601 and a water container 63 is formed in the bottom of the vertical plate 601 can be the polarized reflection object 60a. In this case, the reflected light from the surface of the water 66 flowing down is fully or partly polarized.

Other examples of the polarized reflection object 60a are various shapes of sculptures made of glass, acryl, crystal or plastic. The shape includes a plate shape.

If wall in the illumination space S is made of glass or acryl and the reflected light therefrom is polarized, then the wall can be the polarized reflection object 60a. The sculpture made of crystal can be the polarized reflection object 60a. A glass cup made of glass or crystal can be the polarized reflection object 60a.

The polarized reflection object 60a can have a variety of shapes and can be made of various materials such as glass, acryl, crystal or plastic. Further it and can be installed on the wall, floor or ceiling in the illumination space S or it can be installed in a way that it is hanging down from the ceiling.

The polarized reflection object from which the reflected light is fully or partly polarized includes an object 60a' having a polarizing means 10' and a base member 60' on which the polarizing means 10' is mounted in order to polarize the reflected light compulsory as shown next to the polarized reflection object 60a. In this case, the base member 60' includes all the things that can reflect the light and includes a mirror.

Also, an object in which paint is coated on the base member 60' instead of the polarizing means 10' can be the polarized reflection object.

According to the present invention, the light come to have different polarization directions according to the wavelengths as it is emitted from the light source means 8 and then transmitted through the polarizing means 10 and the birefringence medium 20 is illuminated to the illumination space and it keeps the almost same color of the light of the light source means 8. Normally, the light source means 8 emits the white light and the light illuminated to the illumination space S becomes the white light, which does not cause visual disturbance.

When the light having the different polarization directions according to the wavelengths illuminated to the illumination space S is reflected on the surface of the polarized reflection object 60a, it presents color. That is, it is shown as colored on the polarized reflection object 60a.

When the light having the different polarization directions according to the wavelengths is reflected on the polarized reflection object 60a, some parts of the light according to some wavelengths in which the polarization directions are vertical to the polarization directions formed by the reflection cannot be reflected and other parts of the light according to other wavelengths are fully or partly reflected according to their polarization directions and the polarization direction formed by the reflection so that the colors according to the reflected wavelengths are mixed and a particular color appears on the polarizing reflection object 60a.

Meanwhile, the color shown on the polarized reflection object 60a by the reflection can be seen differently according to the position of the eyes of the viewer. This is because the path of the light from the light source means 8 to the eyes of the viewer transmitted through the polarizing means 10 and the birefringence means 20 and reflected on the polarizing reflection object 60a may change according to the position of the eyes of the viewer.

In particular, according to the position of the viewer, the angle of the incident light to the birefringence medium 20 and path that the light travels in the birefringence medium 20 can be changed and the result from the travel of the light through the birefringence medium 20 becomes different (That is, when the light travels through the birefringence medium 20, the light is differently double refracted by the different birefringence characteristics according to the position of the viewer) and the polarization directions depending on the wavelengths after passing through the birefringence medium 20 becomes different according to the position of eyen of the viewer, then, the wavelengths reflected at the polarized reflection object 60a becomes different and the different color is shown.

Also, in the reflected light on the polarized reflection light 60a, the polarization directions by the reflection and the degree of the polarization and polarizing rate may be different according to the position of eye of the viewer and the color can be changed.

As such, according to the path of the light from the light source means 8 to the eyes of the viewer transmitted through the polarizing means 10 and the birefringence means 20 and reflected on the polarizing reflection object 60a, the color can be differently seen.

Meanwhile, although the eyes are kept in the same position with respect to the polarized reflection object 60a, if the area captured by the eyes at a glance is very large, different colors may be viewed along the near position to the distant position. This is because, if the distance between two positions captured by the eyes at a look is very large, the angle of the incident light to the birefringence medium 20 and the path of the light traveling in the birefringence medium 20 at the respective positions may be different, and the polarization directions, the degree of polarization and the polarizing rate of the reflected light on the polarized reflection object 60a at the respective positions may be different according to the angle of the light started from the light source means 8, reflected on the polarized reflection object 60a and reaching the viewer so that the colors can be different.

Therefore, according to the present invention, if light source means 8 provides the white light, the illumination space S is provided with the white light and there is no visual disturbance. However, the color is shown up on the polarized reflection object 60a and the different color can be seen according to the position of the eyes of the viewer or the beholder. If the area captured by the eyes at a look is very large, the different colors can be seen at the area captured by the eyes at a look.

For example, with reference to FIG. 5, in the sculpture having the flowing water, although the white light is provided by the light source means, the reflected light on the flowing water 66 presents the color and the unique aesthetic effect can be sensed.

According to the present invention, when the light source means provides white light, the reflected light from the polarized reflection object 60a present color although it is impossible to find out the source of the color. And the reflected color can be different according to the position of the eyes of the viewer.

According to the present invention, it is desirable that the light source means 8 is a surface light source to emit the uniform light across the entire surface.

For example, with reference to FIG. 1, the light source means 8 includes a light source 38 and a light guide plate 40 which receives the light of the light source 38 and emits it. In this case, it is desirable to use LED lamp or cold cathode fluorescent lamp (CCFL) as the light source 38 of the light source means 8.

According to the present invention, the polarizing means 10 may include a plurality of zones where the polarization directions are different. Also, the birefringence medium 20 may include a plurality of zones where the birefringence characteristics are different.

For example, as shown in FIG. 2(a), the polarizing means 10 includes three zones 11, 12 and 13 and their polarization directions are different. The polarization directions of the three zones 11, 12 and 13 may be different from one another and may be different between the zones adjoining each other 11 and 12, and 12 and 13.

Also, as shown in FIG. 2(b), the birefringence medium 20 includes three zones 21, 22 and 23 and their birefringence characteristics are different. The birefringence characteristics of the three zones 21, 22 and 23 may be different from one another and may be different between the zones adjoining each other 21 and 22, and 22 and 23.

The birefringence characteristics refer to characteristics causing the different double refraction such as a refraction angle (speed in the medium), refraction direction or propagation distance after the double refraction so on.

If the different birefringence medium is used, the birefringence characteristics become different. (For example, the material is different such as cellophane film or OPP film) The birefringence characteristics of the same birefringence medium become different if the thickness or the direction of the arrangement is different. (For example, placing it to the horizontal direction or to the vertical direction)

In case of the birefringence zones 21 and 22 in FIG. 2(b), if the different materials are used at the zones, their birefringence characteristics become different. (For example, one is cellophane film and the other is OPP film)

If the number of the layers of the same birefringence film is different, the birefringence characteristics become different at the zones.

As such, if the polarizing means 10 or the birefringence medium 20 includes a plurality of zones where the polarization directions or the birefringence characteristics are different, the light emitted from the light source means 8 and transmitted through the polarizing means 10 and the birefringence medium 20 comes to have the different polarization directions according to the wavelengths at the respective zones.

If the polarizing means 10 has a plurality of the zones where the polarization directions are different, the light emitted from the light source means comes to have the different polarization directions according to the zones as it passes through the polarizing means 10. Then, the light is transmitted through the birefringence medium 20 and it comes to have the different polarization directions according to the wavelengths at the respective zones 11, 12 and 13. Then, the light is discharged to the illumination space S.

If the birefringence medium 20 has a plurality of the zones where the birefringence characteristics are different, the light polarized as it is transmitted through the polarizing means 10 after its emission from the light source means 8 is transmitted through the birefringence medium 20 and it comes to have the different polarization directions according to the wavelengths at the respective birefringence zones 21, 22 and 23. Then, the light is discharged to the illumination space S.

If the light having the different polarization directions according to the wavelengths at the respective zones is illuminated to and reflected on the polarized reflection object 60a, the reflected light presents different colors according to the zones. In this case, the different color may be seen as the position of the eyes changes.

According to the present invention, the polarizing means 10 has a plurality of the zones where the polarization directions are different and the birefringence medium 20 has a plurality of the zones where the birefringence characteristics are different at the same time.

According to the present invention, when the polarizing means 10 or the birefringence medium 20 has a plurality of the zones, it is desirable if the zones form shape like pattern or character.

Figure 6:
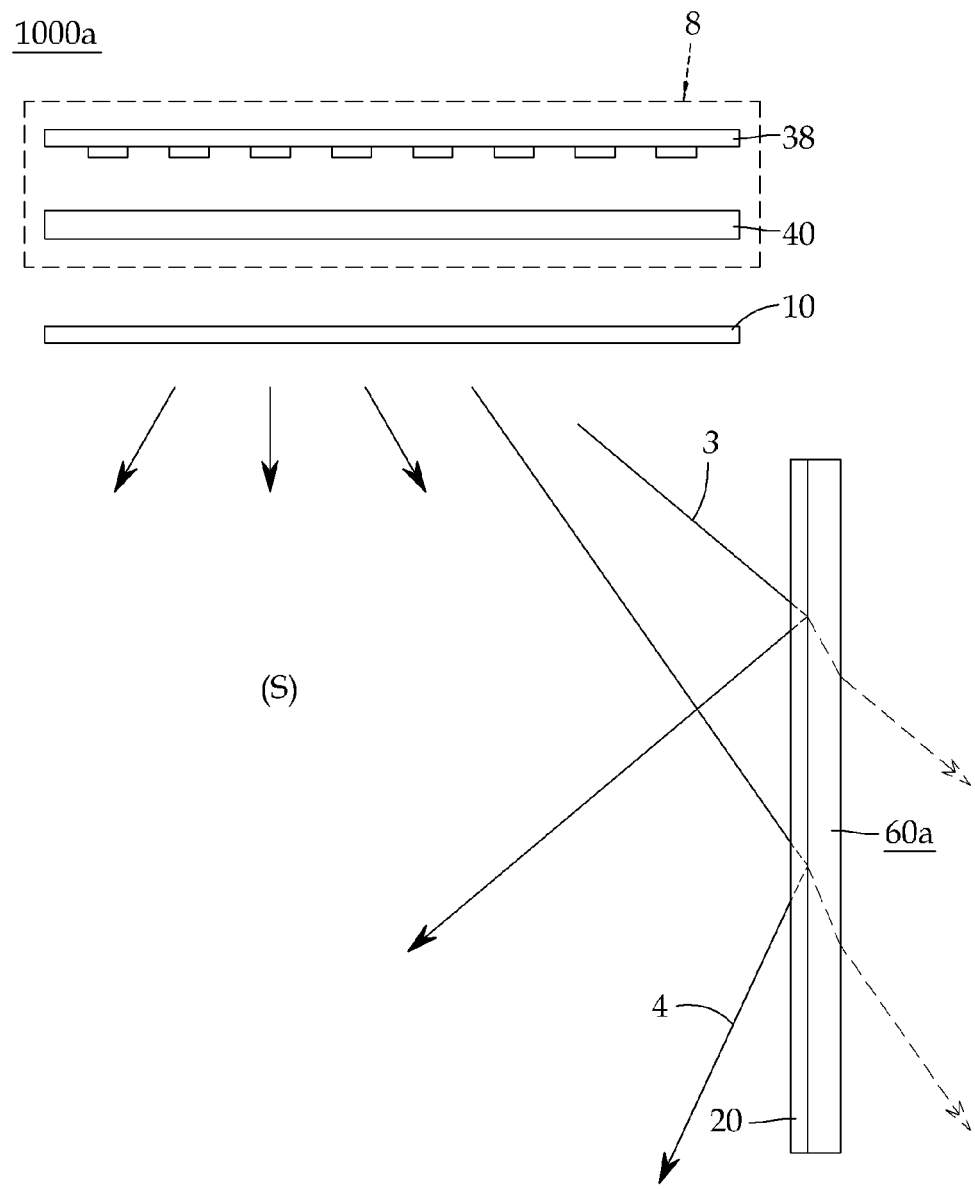
FIG. 6 shows another embodiment of the polarization illumination system according to the first aspect of the first invention.

According to the present invention, as shown in FIG. 6, the birefringence medium 20 can be placed on the surface of the polarized reflection object 60a. For example, the birefringence film as the birefringence medium 20 is attached to the front surface of the polarized reflection object 60a made of glass.

In this case, as described with reference to FIG. 2, the polarizing means 10 or the birefringence medium 20 may be comprised of a plurality of the zones where the polarization directions or the birefringence characteristics are different.

In this case, the polarized reflection object 60a and the birefringence medium 20 arranged on the surface of the polarized reflection object 60a constitutes an illumination object to which the illumination is directed and the light source means 8 and the polarizing means 10 constitutes an illumination means which illuminates the illumination object including the polarized reflection object 60a and the birefringence medium 20.

In this case, the light reflected from the illumination object present a color and if the polarizing means 10 or the birefringence medium 20 includes a plurality of the zones, different colors according to the zones are presented.

Figure 3:
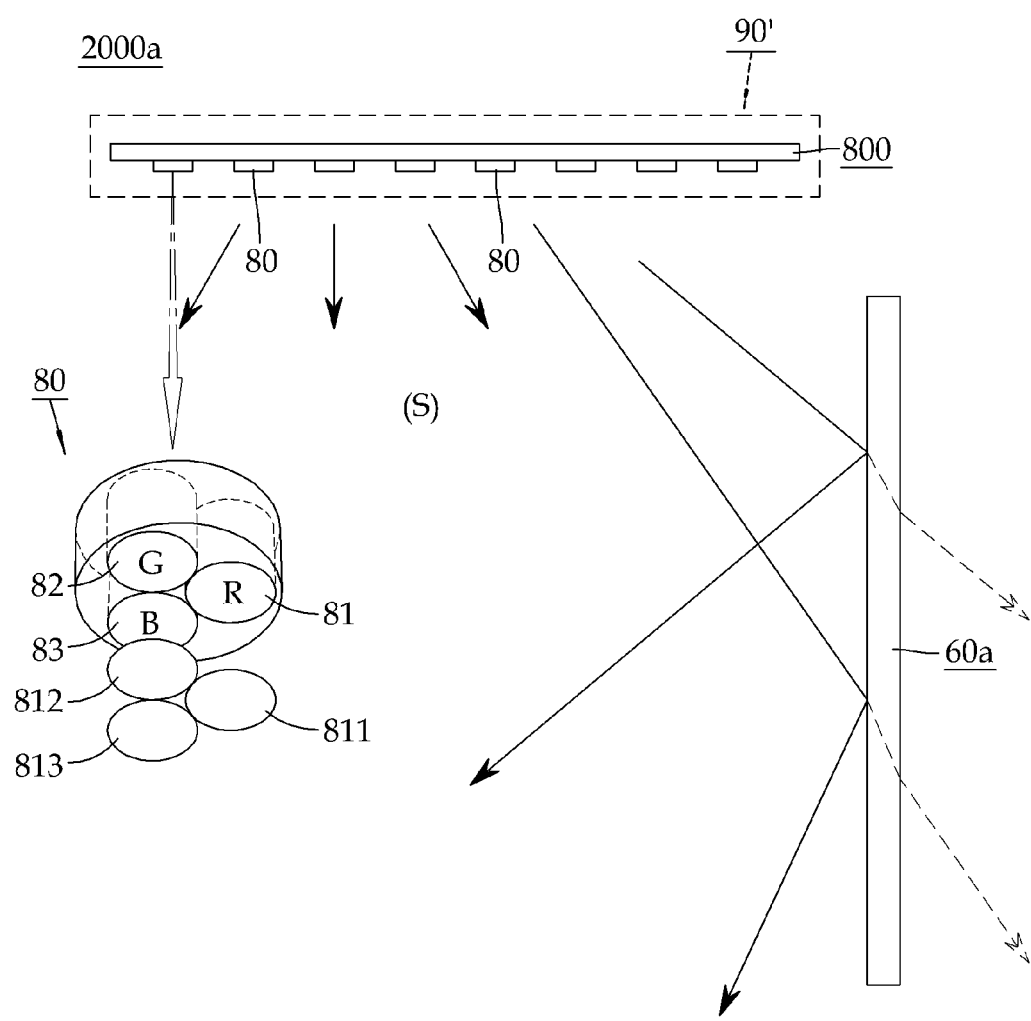
FIG. 3 shows a polarization illumination system according to a second aspect of a first invention.

FIG. 3 shows a polarization illumination system 2000a according to the second aspect of the first invention.

Polarization illumination system 2000a according to the second aspect of the present invention includes a plurality of light sources each emitting different colored light and polarizing means for polarizing light each provided in the respective light sources and the polarizing directions of the polarizing means are different.

The light sources each emitting different colored light and the polarizing means each provided in the respective light sources where the polarization direction of the polarizing means are different constitutes an illumination means 90' according to the second aspect of the present invention.

In this embodiment, LED devices 81, 82 and 83 of R, G and B are provided as the light sources each emitting the different colored light and polarizing films 811, 812 and 813 are attached to LED devices 81, 82 and 83 of R, G and B, respectively. The polarization directions of the polarizing films 811, 812 and 813 are all or partly different from one another. For example, the polarization directions of the polarizing films 811, 812 and 813 can be all different from one another, only the polarization directions of the polarizing films 811 and 812 can be different from each other or only the polarization directions of the polarizing films 812 and 813 can be different from each other.

Further, the LED devices 81, 82 and 83 of R, G and B are densely aligned so that their colors are mixed to produce the white light.

As a result, from the LED devices 81, 82 and 83 of R, G and B, lights of which the polarization directions according to R, G and B wavelengths are different are emitted and they are mixed to produce the white light.

In this embodiment, the LED devices 81, 82 and 83 of R, G and B to which the polarizing films 811, 812 and 813 are attached constitutes a light element 80 and a LED lamp 800 on which a plurality of the light elements 80 are mounted is provided.

Accordingly, from the light elements 80 on the LED lamp 800, the white lights where the polarization directions are different according to R, G and B wavelengths are discharged to the illumination space S for illumination.

According to the second aspect of the first invention, the polarized reflection object 60a according to the first aspect of the first invention is provided.

Accordingly, from the light elements 80 in the LED lamp 800, the white lights where the polarization directions are different according to R, G and B wavelengths are illuminated to the illumination space S and the reflected light from the polarized reflection object 60a present color.

When the light of which the polarization directions are different according to R, G and B wavelengths is reflected on the polarized reflection object 60a, some parts of the light according to some wavelengths of which the polarization directions are vertical to the polarization directions formed by the reflection cannot be reflected and other parts of the light according to other wavelengths are fully or partly reflected according to their polarization directions and the polarization direction formed by the reflection so that the colors according to the reflected wavelengths are mixed and a particular color appears on the polarizing reflection object 60a.

Figure 4:
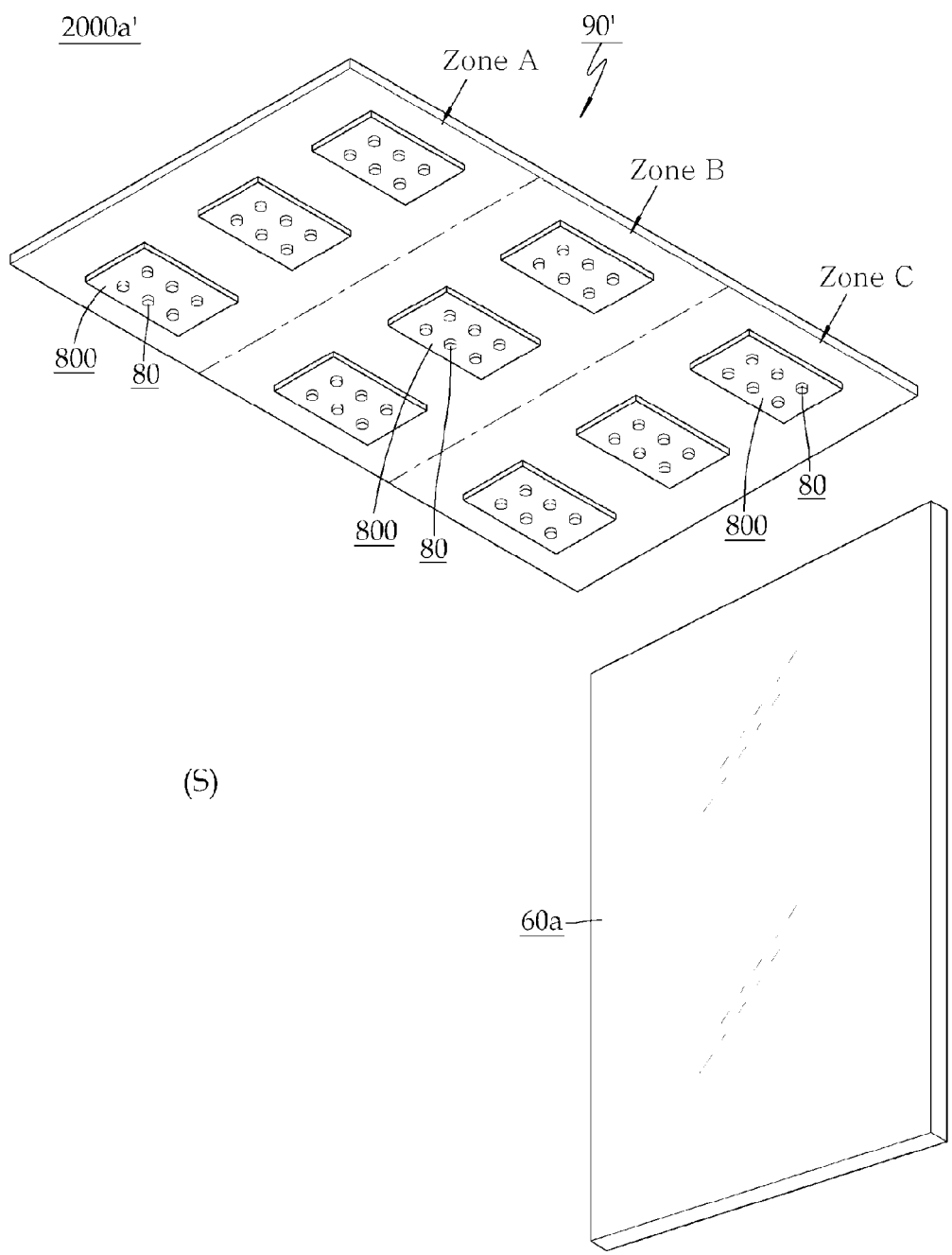
FIG. 4 shows that illumination means has a plurality of zones in the polarization illumination system according to the second aspect of the first invention.

FIG. 4 shows another example of a polarization illumination system 2000a' according to the second aspect of the first invention.

In this case, the illumination means 90' has a plurality of zones and the polarization directions of the light sources emitting the same colored lights are the same in the same zone, however, they are different in another zones.

With reference to FIG. 4, the illumination means 90' has zones of A, B and C and, for example, in the zone A, the polarization directions of the light sources having the same color in the light elements 80 are the same. But, the polarization directions of the light sources having the same color between the zones A and B are different.

In this case, the light where the polarization directions according to the wavelengths are different according to the zones are emitted.

In FIG. 4, a plurality of LED lamps 800 are provided according to the zones and, in the same zone, the polarization directions of the LED devices of R in the light elements 80 in the LED lamps 800 are the same. This is the same case in the LED devices of G and B.

But, between the different zones, the polarization directions of the LED devices of R in the light elements 80 are different. This is the same case in the LED devices of G and B.

Accordingly, from the illumination means 90', the light where the polarization directions are fully or partly different according to the wavelengths of R, G and B and the polarization directions of the wavelengths of R, G and B are different according to the zones respectively. Therefore, when the light as such is reflected on the polarized reflection object 60a, the light having the different polarization directions according to the wavelengths by the zones is incident and reflected and the reflected light present different colors corresponding to the zones.

As such, according to the first invention, the polarization illumination system where the polarized light is emitted and the light presenting color is reflected on the polarized reflection object is provided.

According to the first invention, the light discharged from the illumination means is the white light not causing any visual disturbance and the light reflected on the polarized reflection object presents color. If the polarizing means or the birefringence medium has a plurality of the zones where the polarization directions or the birefringence characteristics are different, the different colored lights are reflected according to the zones on the polarized reflection object.

According to the first invention, the color of the reflected light can be viewed differently according to the position of the eyes of the beholder.

Further, the first invention provides the light source means each emitting the different colored light and having the polarizing means. The polarization directions of the polarizing means are different according to the emitting colors of the light source means. Accordingly, the light where the polarization directions are different according to the wavelengths of the respective colors are emitted and the reflected light on the polarized reflection object presents color.

In this case, the light source means have the zones and the polarization directions of the light source means emitting the same colors are different if the zones are different so that the reflected light from the polarized reflection object has the different colors according to the zones.

Next, FIGS. 7 to 13 illustrate a polarization illumination system according to the second invention of the present patent application.

The second invention is directed to the polarized reflection object which reflects the incident light in a way that the reflected light is fully or partly polarized such as glass, acrylic, crystal or plastic or a surface of liquid through which the effect of the first invention is achieved and presents the illumination that the color of the reflected light on the polarized reflection object changes.

Figure 7:
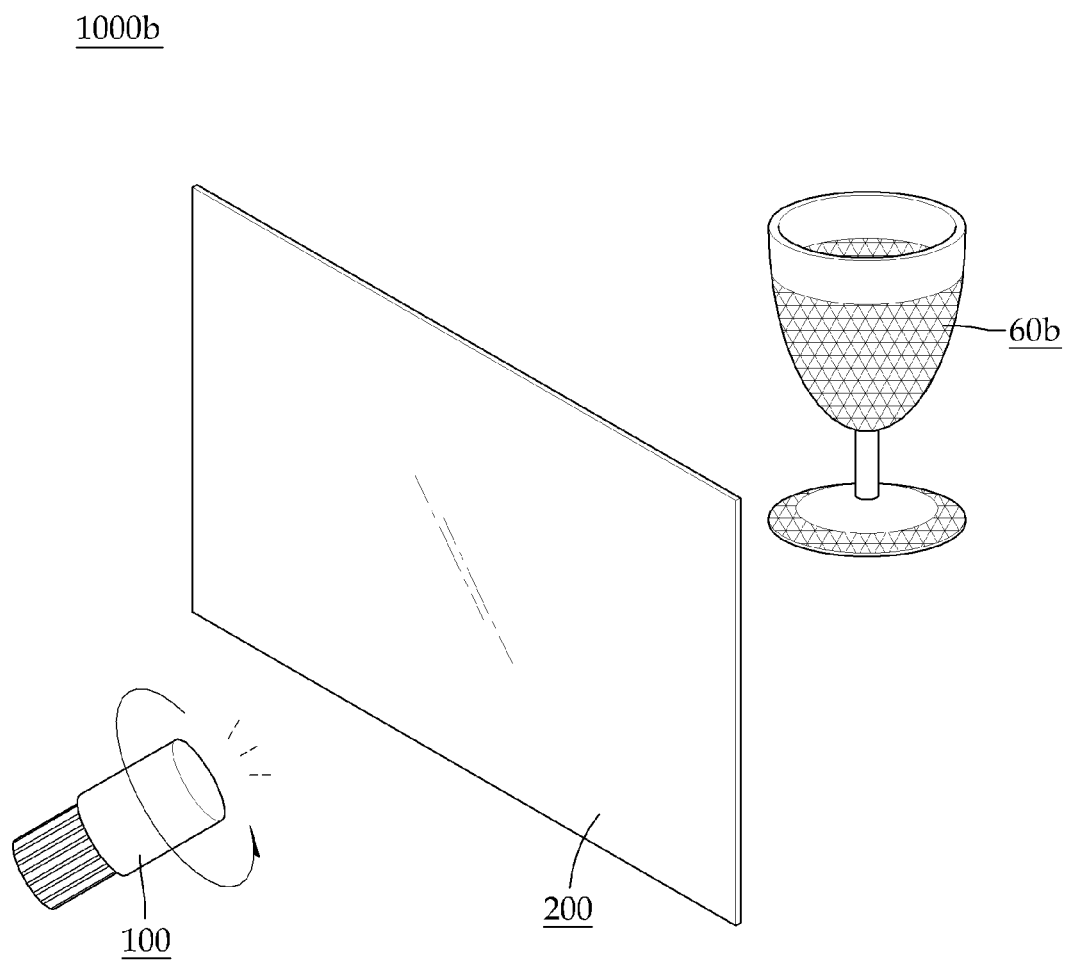
FIG. 7 shows a polarization illumination system according to a first aspect of a second invention.

Firstly, FIG. 7 shows a polarization illumination system 1000b according to the first aspect of the second invention.

First, a polarized reflection object 60b is provided. In this embodiment, a glass is provided as the polarized reflection object. In addition, a polarizing light source 100 is provided, and the polarizing light source 100 emits light for illuminating a polarized reflection object 80.

As the polarizing light source 100, for example, a light source to which a polarizing means such as a polarizing film, a polarizing plate or a polarizing filter is attached may be provided. The light emitted from the light source is polarized as it passes through the polarizing means and is, then, illuminated.

According to the second invention, a birefringence medium 200 is disposed between the polarizing light source 100 and the polarized reflection object 60b.

The birefringence medium 200 may be disposed at various locations between the polarizing light source 100 and the polarized reflection object 60b. The birefringence medium may be independent of the polarizing light source 100 and of the polarized reflection object 60b at its disposition between the polarizing light source and the polarized reflection object. In other case, the film-type birefringence medium may be attached to the polarizing light source 100 or it may be attached to a surface of the polarized reflection object 60b.

According to the second invention, the polarization direction of the light emitted from the polarizing light source 100, the birefringence medium 200 and the polarized reflection object 60b rotate relative to one another. This relative rotation includes below 6 (six) occasions.

Firstly, the polarization direction of the light emitted from the polarizing light source 100 and the birefringence medium 200 are rotated relative to each other and the polarized reflection object 60b is in a stationary state.

This includes a case in which the polarization direction of the light emitted from the polarizing light source 100 is not changed and the birefringence medium 200 is rotated, a case in which the polarization direction of the light emitted from the polarizing light source 100 is rotated and the birefringence medium 200 is in a stationary state or a case in which the polarization direction of the light emitted from the polarizing light source 100 and the birefringence medium 200 are rotated and their rotation speeds differ from each other.

Secondly, the polarizing light source 100 is in a stationary state, and the birefringence medium 200 and the polarized reflection object 60b are rotated relative to each other.

This also includes a case in which one of the birefringence medium 200 and the polarized reflection object 60b is in a stationary state and the other is rotated and a case in which both of them are rotate and their rotation speeds differ from each other.

Thirdly, the birefringence medium 200 is in a stationary state, and the polarization direction of the light emitted from the polarizing light source 100 and the birefringence medium 200 are rotated relative to each other.

This also includes a case in which the polarization direction of the light emitted from the polarizing light source 100 is not changed and the polarized reflection object 60b is rotated, a case in which the polarization direction of the light emitted from the polarizing light source 100 is rotated and the polarized reflection object 60b is a stationary state or a case in which the polarization direction of the light emitted from the polarizing light source 100 and the polarized reflection object 60b are rotated and their rotation speeds differ from each other.

Fourthly, all of the polarizing light source 100, the birefringence medium 200 and the polarized reflection object 60b are rotated and their rotation speeds differ from one another.

Fifthly, the polarization direction of the polarizing light source 100 and the birefringence medium 200 are rotated together or at the same velocity, and the polarized reflection object 60b is in a stationary state.

Sixthly, the polarizing light source 100 is in a stationary state, and the birefringence medium 200 and the polarized reflection object 60b are rotated together or at the same velocity.

FIG. 7 illustrates that the polarization direction of the light emitted from the polarizing light source 100 is changed according the rotation and the birefringence medium 200 and the polarized reflection object 60b are in a stationary state.

According to the second invention, the above rotation includes a rotation within a range of a certain angle or a change of angle. For example, the above rotation includes the partial rotation of 30°, 60°, 90° or 180° or a change of angle by the above values.

According to the second invention as illustrated above, the polarized light emitted from the polarizing light source 100 is double-refracted as it passes through the birefringence medium 200 and then, it comes to have different polarization directions according to the wavelengths. The light having the different polarization directions according to the wavelengths is transmitted to the polarized reflection object 60b.

When the light having the different polarization directions according to the wavelengths is reflected on the polarized reflection object 60b, some parts of the light according to some wavelengths in which the polarization directions are vertical to the polarization directions formed by the reflection cannot be reflected and other parts of the light according to other wavelengths are fully or partly reflected according to their polarization directions and the polarization direction formed by the reflection so that the colors according to the reflected wavelengths are mixed and a particular color appears.

By the way, according to the second invention, as the polarizing light source 100, the birefringence medium 200 and the polarized reflection object 60b are rotated relative to one another, the polarization directions according to the respective wavelengths in the light illuminated to the polarized reflection object 60b change with reference to the polarized reflection object 60b.

In the embodiment shown in FIG. 7, for example, the polarization direction of the light emitted from the polarizing light source 100 is rotated and the light of which the polarization direction changes according to the rotation passes through the birefringence medium 200 and, then, the polarization directions of the light become different according to the wavelengths. Such a light is illuminated to the polarized reflection object 60b. Accordingly, the light part according to the wavelengths that can be reflected on the polarized reflection object 60b and other light part according to the wavelengths that cannot be reflected thereon are changed and the reflected color on the polarized reflection object 60b is changed according to the rotation of the polarization direction of the light emitted from the polarizing light source 100.

Similarly, in a case where the birefringence medium 200 is rotated, if the polarized light emitted from the polarizing light source 100 passes through the birefringence medium 200 which is being rotated, the polarization direction is changed according to each wavelength and the polarization direction corresponding to each wavelength is rotated according to a rotation of the birefringence medium 200 so that the color on the polarized reflection object 60b is changed.

Figure 8:
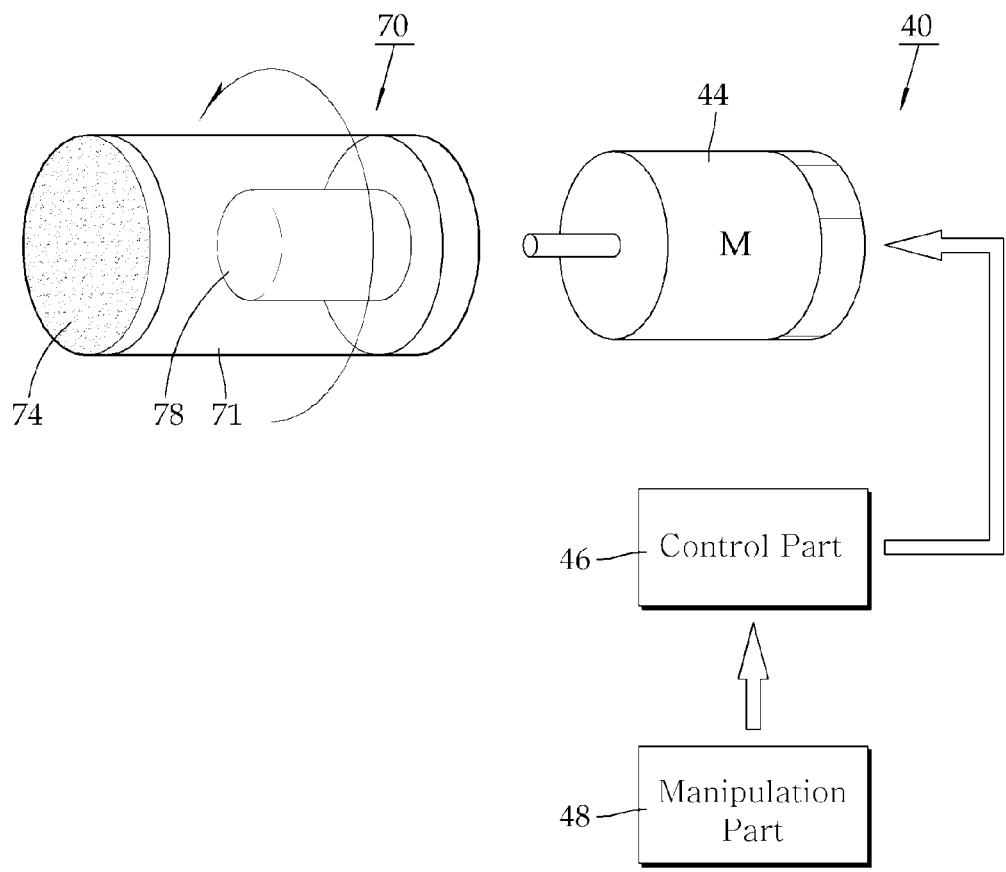
FIG. 8 shows a structure of a polarized light source where polarization direction of the emitting light rotates.

FIG. 8 shows one example of the polarizing light source 100 which emits the light where the polarization direction is rotated as described above.

The polarizing light source 100 includes a polarizing light source part 70 and a driving part 40 for rotating the polarizing light source part 70.

The polarizing light source part 70 is provided with a body part 71, a light source 78 is installed in the body part 71, and a polarizing filter 74 is coupled to a front surface of the light source 78. Accordingly, the light emitted from the light source 78 is polarized as it passes through the polarizing filter 74.

The driving part 40 includes a motor 44, and may have a control part 46 for controlling an operation of the motor 44 and a manipulation part 48 for manipulating an operation of the motor 44.

The motor 44 is coupled to the body part 71 so that the body part 71 is rotated by the power from the motor 44 to rotate the polarization direction of the light emitted from the polarizing light source part 70.

As another example, the body part 81 is fixed and the motor 44 rotates the polarizing filter 74 to enable the polarization direction of the light, which is emitted from the light source 78 and polarized as it passes through the polarizing filter 74, to be rotated.

Although not shown in the drawing, a device such as a reduction gear or a planetary gear may be provided between the motor 44 and the body part 71 for controlling a rotation of the body part 71 according to a control of the control part 46.

According to the second invention, the polarizing light source part 70 is not necessarily driven by the motor, but may be driven by another means. The manual driving is also possible.

The polarizing light source 100 is installed to illuminate the polarized reflection object 60b and it may be plurally provided.

Figure 9:
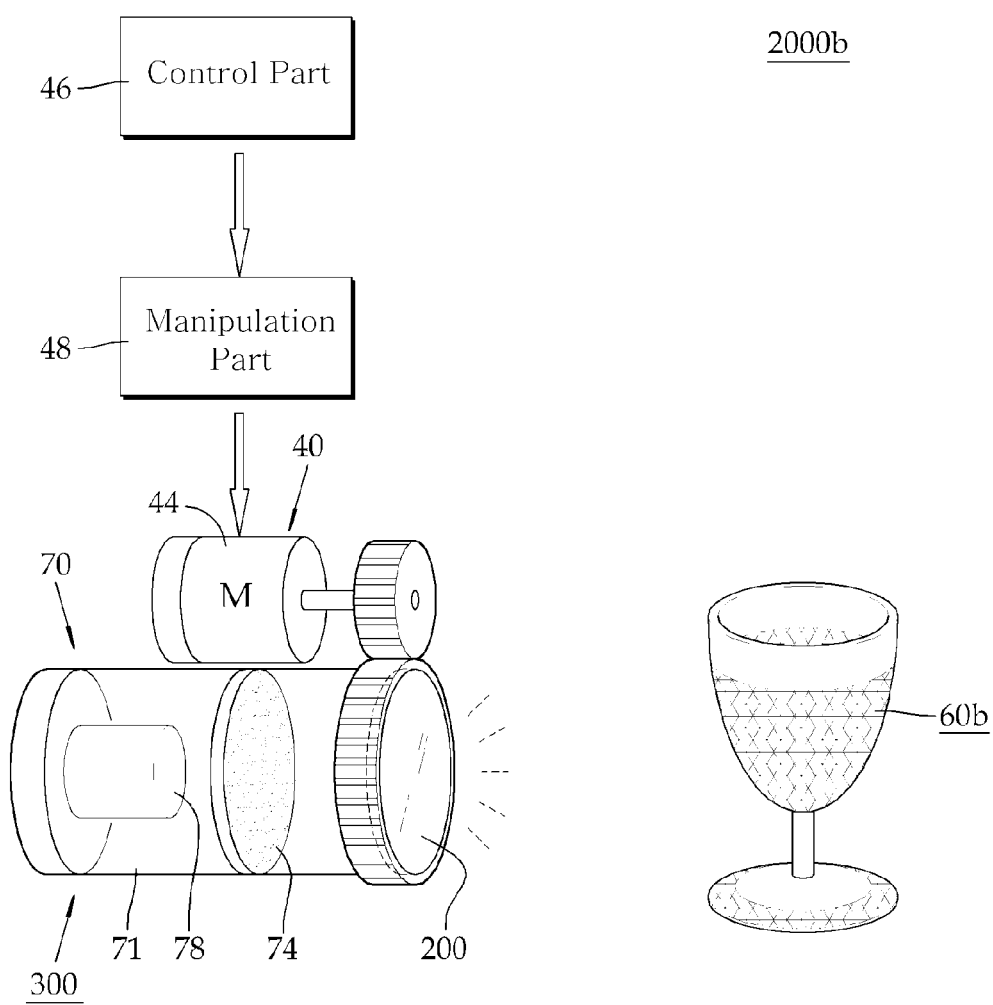
FIG. 9 shows a polarization illumination system according to a second aspect of the second invention.

FIG. 9 illustrates another example of a polarization illumination system 2000 according to the second invention and shows a structure where the film-type birefringence medium 200 is attached to a front surface of the polarizing light source part 70 and the birefringence medium 200 is rotated by means of the motor 44.

The light of the light source 78 is polarized as it passes through the polarizing filter 74 and then, the light passes through the rotating birefringence medium 200 so that the light of which the polarization direction changes according to the wavelengths is illuminated to the polarized reflection object 60b.

In other case, with reference to FIG. 8, it is possible that the film-type birefringence medium 200 is attached to a front surface of the polarizing filter 74 to form the polarizing light source 100 and the birefringence medium 200 integrally with each other and rotated together (not shown).

Meanwhile, the birefringence medium 200 may be rotated manually.

In the example shown in FIG. 8 or FIG. 9, it is possible to variously control the speed of the motor 44 so a speed of change of color can be variously created.

In addition, such relative rotation may include various motions, for example, such as reciprocation.

The reciprocation means that the polarization direction of the light emitted from the polarizing light source 100 reciprocates between 0° and 180°.

Referring to the example shown in FIG. 8 or FIG. 9, the above function may be achieved by controlling a rotation angel of an output shaft of the motor 44 within a range of 0° to 180°.

In another case, the rotation direction or the rotation angle may be variously changed in the relative rotation of the polarization direction of the light emitted from the polarizing light source 100 and the birefringence medium 200. In the example in FIG. 8 or FIG. 9, they are possible by controlling the rotation direction or the rotation angle of the output shaft of the motor 44.

Figure 10:
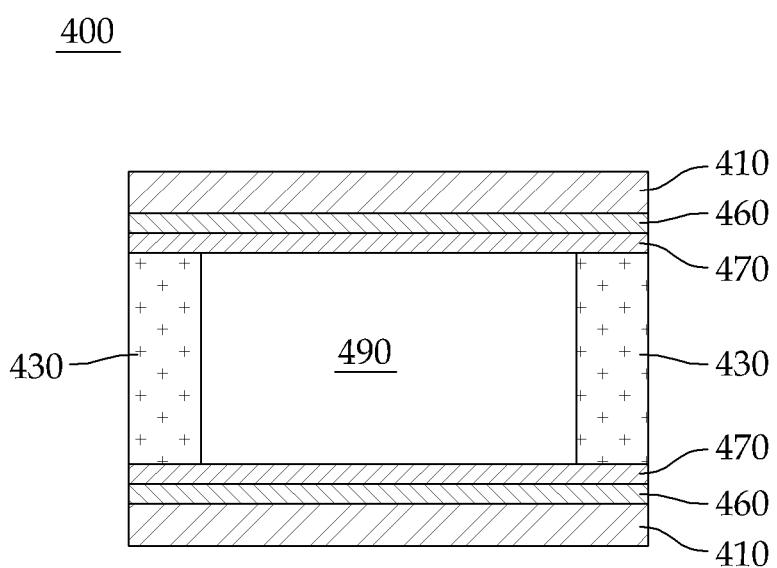
FIG. 10 shows a liquid crystal device that rotates polarization direction according the second invention.

According to the second invention, the polarization direction may be changed by means of a liquid crystal device. FIG. 10 shows an example of a liquid crystal device 400 as such.

In the liquid crystal device 400 for making a change of the polarization direction, a space (not shown) is interposed between glass substrates 410 and 410 to secure a space, and the space is filled with liquid crystal 490 and then sealed by a sealant 430. On each lower part of the glass substrates 410 and 410, a transparent electrode 460 and a liquid crystal alignment layer 470 are sequentially laminated.

When a voltage is applied to the transparent electrodes 460 and 460, an arrangement of the liquid crystal 490 is changed so that if the polarized light is transmitted to the glass substrates 410 and 410, the polarization direction of the light is changed as the light passes through the liquid crystal. Substantially, the above structure is the same as that of a LCD panel except that the polarizing plate is removed therefrom.

Figure 11:
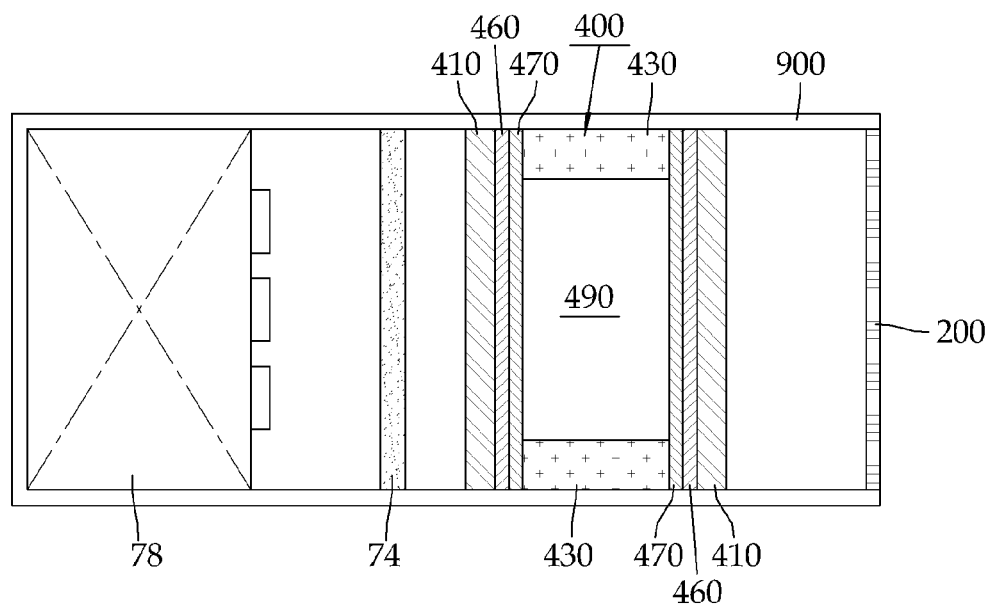
FIG. 11 shows an example of a light emission device where the light that polarization directions according to wavelengths change is emitted.

FIG. 11 illustrates one example a light emission device 500 utilizing the liquid crystal device 400 shown in FIG. 10 for emitting the light having various rotatable polarization directions according to the wavelengths.

The light source 78 is provided in a case member 900, a polarizing means 74 such as the polarizing film or the polarizing filter is arranged in front of the light source 78, the liquid crystal device 400 for rotating the polarization direction is arranged in front of the polarizing means, and the birefringence medium 200 is arranged in front of the liquid crystal device.

By this structure, the light emitted from the light source 78 is polarized as it passes through the polarizing means 74. Then, while the light passes the liquid crystal device 400, the polarization direction of the light is rotated and the light passes through the birefringence film 200. Therefore, the light of which the polarization directions are different from one another according to the wavelength and are changing is emitted.

Figure 12:
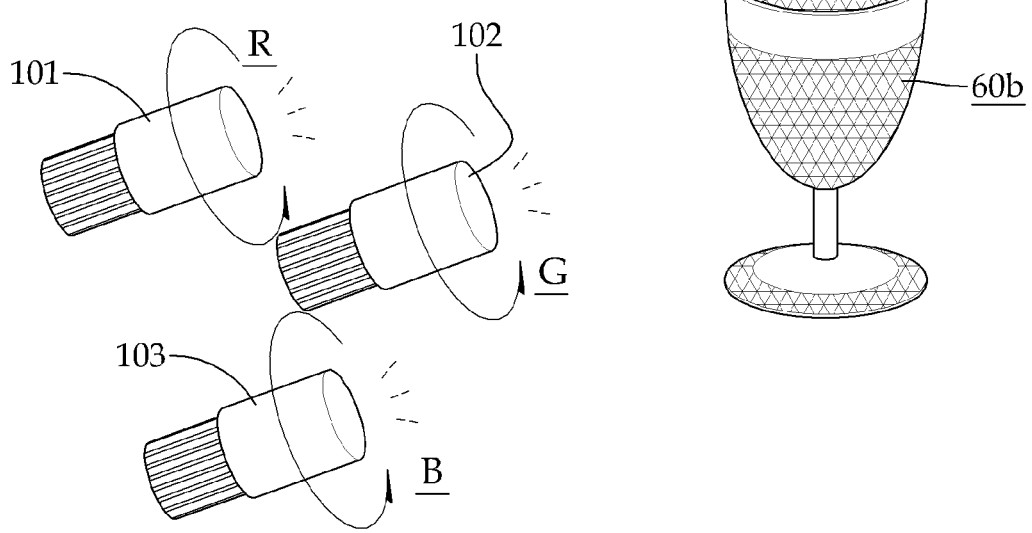
FIG. 12 shows a polarization illumination system according to a third aspect of the second invention.

FIG. 12 illustrates a polarization illumination system 3000b according to the third aspect of the second invention.

According to the third aspect, three polarizing light sources 101, 102 and 103 emitting three red (R), green (G) and blue (B) colored polarized lights, respectively, are provided. The lights emitted from three polarizing light sources 101, 102 and 103 are mixed to produce the white-color light to be illuminated to the polarized reflection object 60b, and the polarization direction of one or two of three polarizing light sources 101, 102 and 103 or all the polarizing light sources and the polarized reflection object 60b are rotated relative to one another.

In FIG. 12, each of three polarizing light sources 101, 102 and 103 has a structure of the polarizing light source shown in FIG. 8, and the light source 78 of them is emitting R, G and B, respectively.

For example, the red (R) colored polarizing light source 101 may employ a red-colored LED as its light source 78 with respect to the structure of the polarizing light source 100 in FIG. 8. Accordingly, the polarized light of red (R) wavelength of which the polarization direction rotates is emitted.

In this case, the illuminated to the polarized reflection object 60b is the white light however, internally, it has R, G and B wavelengths and the polarization directions of the R, G and B wavelengths are rotated, respectively.

According to the polarization directions in the reflected polarized light from the polarized reflection object 60b, some of the light is reflected and some is not reflected, and the reflected are mixed to produce the color. Here, since the polarization directions according to R, G and B wavelengths are changed, the color is also changed.

Figure 13:
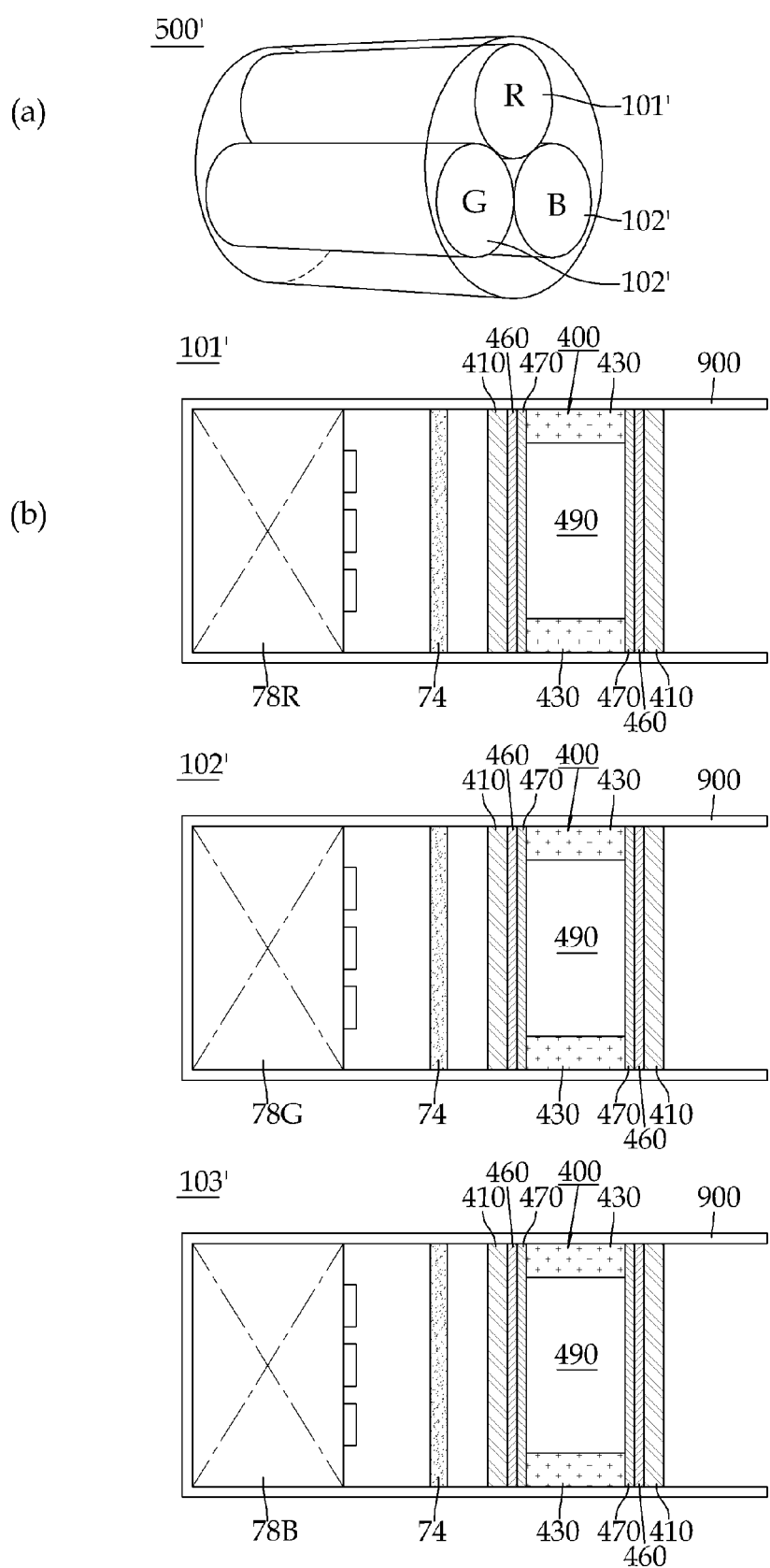
FIG. 13 shows an example of a light emission device where the light of which the polarization directions according to wavelengths of R, G and B change is emitted.

FIG. 13 illustrates one example of a light emission device 500' utilizing the liquid crystal device 400 shown in FIG. 4 for emitting the light having various polarization directions according to the R, G, B wavelengths and for rotating the polarization direction of the light according to the R, G, B wavelengths.

In the device 101' for emitting the red-polarized light having the red-colored wavelength and for rotating the polarization direction of the light, the light source 78R emitting the light with red-colored wavelength is provided, the polarizing means 74 such as the polarizing film or the polarizing filter is installed in front of the light source, and the aforementioned liquid crystal device 400 is installed in front of the polarizing means.

In the device 102' for emitting the green-polarized light having the green-colored wavelength and for rotating the polarization direction of the light, the light source 78G emitting the light with green-colored wavelength is provided, the polarizing means 74 such as the polarizing film or the polarizing filter is installed in front of the light source, and the aforementioned liquid crystal device 400 is installed in front of the polarizing means.

In the device 103' for emitting the blue-polarized light having the blue-colored wavelength and for rotating the polarization direction of the light, the light source 78B emitting the light with blue-colored wavelength is provided, the polarizing means 74 such as the polarizing film or the polarizing filter is installed in front of the light source, and the aforementioned liquid crystal device 400 is installed in front of the polarizing means.

In the devices 101', 102', 103' for emitting polarized lights of R, G and B and rotating their polarization directions, the liquid crystal device 400 are densely aligned as shown in (a) of FIG. 13 to mix the lights with the wavelengths for producing the white-colored light.

As described above, the second invention provides the polarizing illumination system utilizing polarization to create a distinctive display that presents change of the color on the polarized reflection body to which the light is illuminated.

According to the second invention, the light emitted from the polarizing light source to the polarized reflection object does not cause a visual disturbance though the strength of the light is weakened.

Accordingly, when the polarization illumination system according to the second invention is installed, peoples do not feel visual disturbance and can keep their normal life. In other words, the second invention provides the polarization illumination system in which the light emitted from the light source does not cause the visual disturbance for people and the color of the polarized reflection object to which the light is illuminated is changeably appeared.

On the other hands, in the polarization illumination system or the polarization illumination device according to the second invention, although the polarizing light source 100, the birefringence medium 200 and the polarizing reflection object 60b are not rotated, but are in a stationary state, the light reflected on the polarizing reflection object 60b has the color. This structure essentially belongs to the category of the first invention, but belong to all the first and second inventions in the view of the embodiment. This kind of example is the case where the polarized light emitted from the light source 78 passes through the birefringence medium 200 and is then illuminated to the polarized reflection object 60b such as a glass cup without the motor 44 or the liquid crystal device 400.

FIGS. 14 to 23 illustrate a polarization illumination system according to the third invention of the present patent application.

The third invention of the present patent application provides a polarization reflection illumination system in which a color of the light reflected on a reflection object having a reflection member such as a mirror ball is changed.

Figure 14:
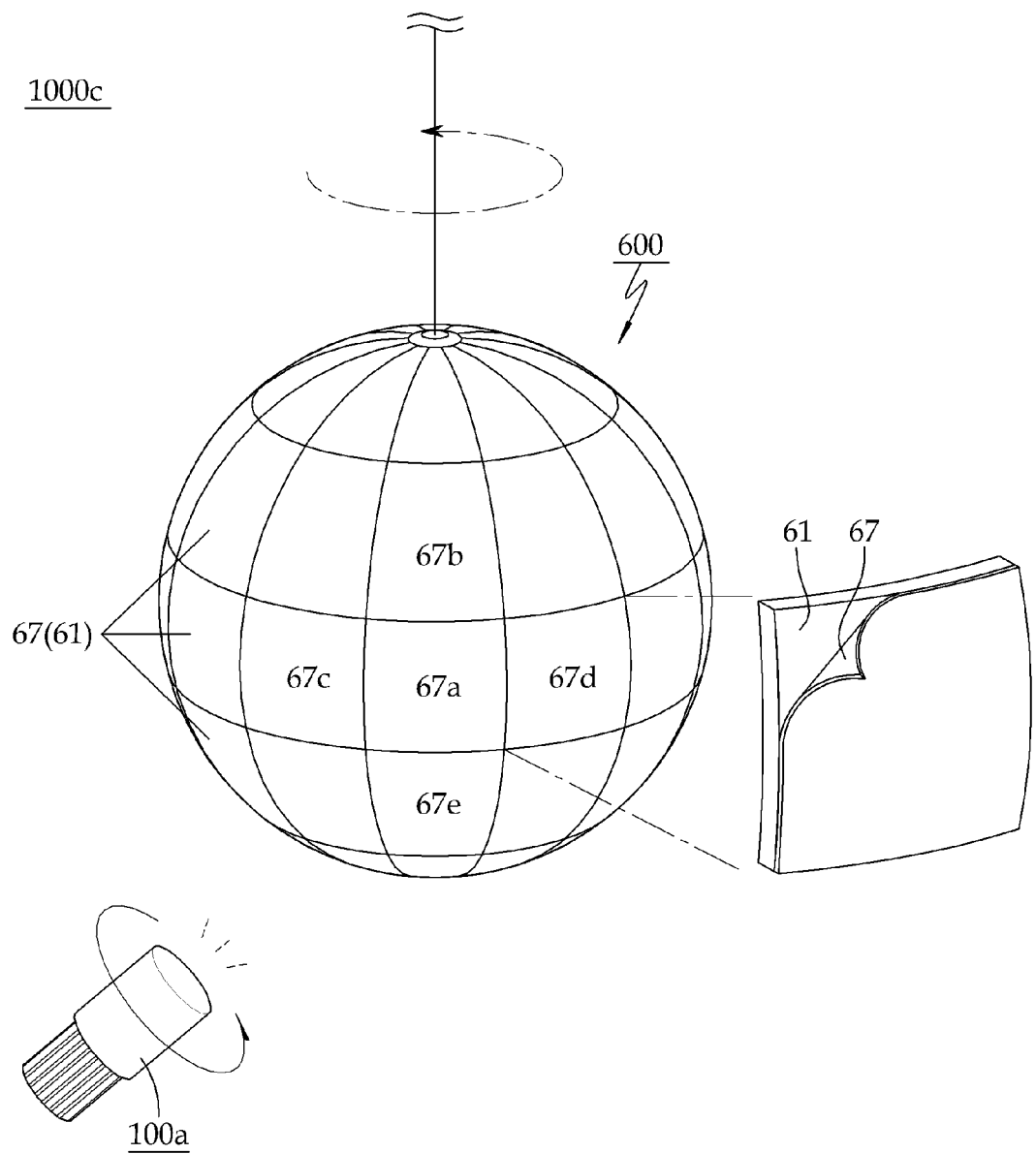
FIG. 14 shows an embodiment of a mirror ball illumination system according to a third invention.

First, FIG. 14 shows a mirror ball illumination system 1000c according to the third invention, the mirror ball illumination system 1000c is provided with a mirror ball 600.

A plurality of reflection members 61 such as mirrors are adjacent to each other to allow the reflection members to be attached to a spherical surface of the mirror ball 600 to cover a spherical surface. According to the present invention, a polarizing means 67 polarizing the penetrating light is attached to an upper surface of the reflection member 61.

The polarizing means 67 may be a polarizing filter, a polarizing film, a polarizing plate and the like, a polarizing film is utilized as the polarizing means in this embodiment.

The polarizing films 67 attached to the upper surface of the plurality of reflection members 61 are attached to every reflection member. However, it is not necessary to have the above structure.

In addition, it is preferable that the polarization direction of the polarizing film 67 differs from that of the adjacent polarizing film 67. For example, the polarization direction of the polarizing film 67a differs from those of the polarizing films 67b, 67c, 67d and 67e adjacent to the polarizing film 67a. In the above structure, the different colored-lights are emitted from every adjacent reflecting member as illustrated later.

Figure 15:
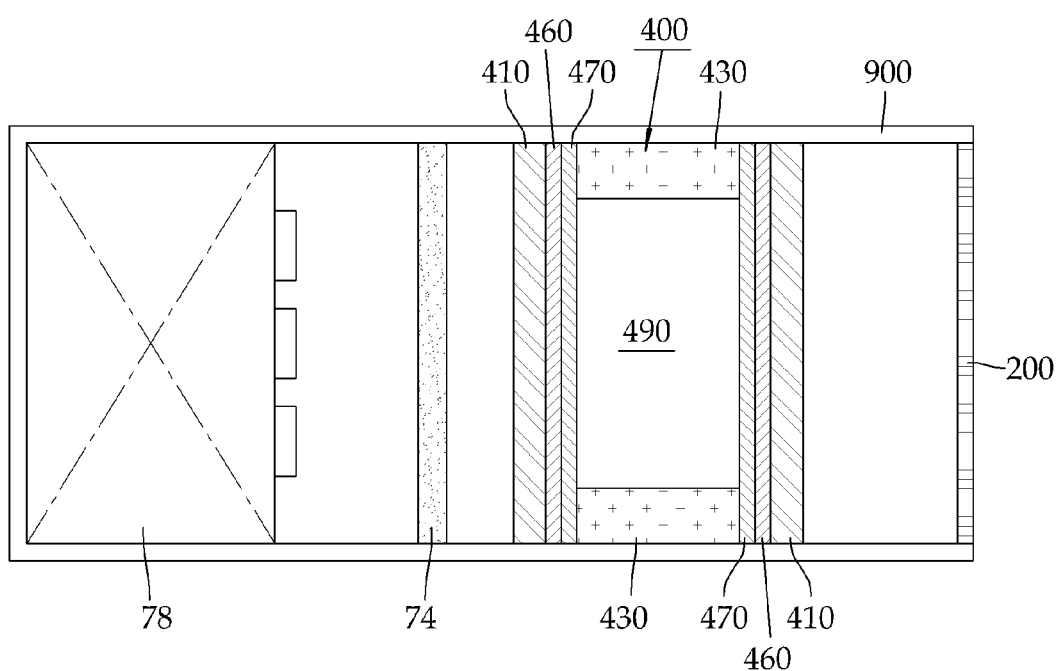
FIG. 15 shows an example of a polarized double refracted light source in the mirror ball illumination system according to the third invention.

According to the third invention, the mirror ball illumination system 1000c has the polarizing light source 70, this polarizing light source 70 emits the polarized light (see FIG. 15).

For example, a device in which the polarizing means 74 such as a polarizing film, a polarizing plate or a polarizing filter is attached to the light source 78 to allow the light emitted from the light source 78 to be polarized as it passes through the polarizing means 74 such as a polarizing film, a polarizing plate or a polarizing filter, and to be illuminated, may be provided as the polarizing light source.

In addition, according to the present invention, the birefringence medium 200 is provided, this birefringence medium is disposed between the polarizing light source 70 and the polarizing film 67 on a surface of the mirror ball so that the light emitted from the polarizing light source 70 passes through the birefringence medium 200 and is then illuminated to the polarizing film 67 of the mirror ball 600.

The birefringence medium 200 may be disposed at various locations between the polarizing light source 70 and the polarizing means 67. The birefringence medium may be disposed independently of the polarizing light source 70 and the polarizing means 67 between the polarizing light source and the polarizing means, or the film type birefringence medium may be attached to the polarizing means 74 of the polarizing light source 70 or an upper surface of the polarizing means 67 at the mirror ball 600.

In this embodiment, as shown in FIG. 15, the polarizing means 74 such as a polarizing plate or a polarizing film is provided in front of the light source 78, and the birefringence medium 200 such as a birefringence plate or a birefringence film is provided in front of the polarizing means.

An stretchable plastic film such as OPP film and PET film having the birefringence property, or a cellophane film, a plastic plate may employed as the film type birefringence medium, and a birefringence film manufactured specially only for the birefringence may be utilized as the film type birefringence medium. A birefringence plate, a birefringence lens and the like may be employed as the birefringence medium.

According to the present invention, the polarization direction of the light emitted from the polarizing light source 70, a location of one point of the birefringence medium 200 and the polarization direction of each polarizing film 67 attached to the mirror ball 60 are changed relative to each other. The above relative change may include the below occasions. At this time, a change of location of one point of the birefringence medium means that a location of one random point on the birefringence medium is changed, and includes that a point on an axis of rotation is not changed and a location of random point at another place is changed if the birefringence medium is rotated.

Firstly, the polarization direction of the light emitted from the polarizing light source 70 and the birefringence medium 200 are rotated relative to each other and the mirror ball 600 is in a stationary state.

This includes a case in which one of the polarizing light source and the birefringence medium is in a stationary state and the other is rotated and a case in which both of the polarizing light source and the birefringence medium are rotated and their rotation speeds differ from each other.

Secondly, the polarizing light source 70 is in a stationary state, and a point of the birefringence medium and the polarization direction of the polarizing means 67 provided on the mirror ball 600 are displaced relative to each other. For example, this may include a case in which the birefringence medium 200 is rotated or a case in which the birefringence medium 200 and the mirror ball 600 are rotated relative to each other at different speeds of rotation.

Thirdly, the birefringence medium is in a stationary state, and the polarization direction of the light emitted from the polarizing light source and the polarization direction of each polarizing means 67 provided on the mirror ball 600 are changed relative to each other. This also may include a case in which one of the polarizing light source 70 and the mirror ball 600 is in a stationary state and the other is rotated.

Fourthly, all the polarizing light source 70, the birefringence medium and the mirror ball 600 are displaced.

Fifthly, the polarizing light source is displaced together with the birefringence medium and the mirror ball 600 is in a stationary state.

Sixthly, the polarizing light source is in a stationary state, and the birefringence medium and the mirror ball 600 are displaced together. For example, this case means that the polarizing light source is in a stationary state and the mirror ball 600 is rotated. In the mirror ball 600, meanwhile, the birefringence film is attached to a surface of the polarizing means 67.

The fifth and sixth cases include the case in which two elements are integrally displaced and the case in which two elements are displaced along the same path at a constant velocity.

According to the present invention, the above rotation includes a rotation within a range of certain angles. In other words, the above rotation includes a change of angle such as 30°, 60°, 90° or 180°.

In the embodiment of FIG. 14, a polarized double refracted light source 100a is provided so that the polarizing light source 70 and the birefringence medium 200 are rotated integrally with each other, and the mirror ball 600 may be in a stationary state or rotated.

In the embodiment of FIG. 14, the polarized double refracted light source 100a is provided. FIG. 15 illustrates a structure of the polarized double refracted light source 100a.

Firstly, the polarized double refracted light source 100a is provided with a body part 71. The light source 78 is installed in the body part 71, and the polarizing means 74 such as a polarizing filter or a polarizing film 74 is installed in front of the light source. Thus, the light emitted from the light source 78 is polarized as it passes the polarizing means 74, and the light source 78 and the polarizing means 78 form the polarizing light source 70 emitting the polarized light.

In the body part 71, the birefringence medium such as the birefringence plate is installed in front of the polarizing means 74. Accordingly, the light emitted from the light source 78 and polarized through the polarizing means 74 is double-refracted as it passes the birefringence plate 200, and the light having the polarization direction changed by its wavelength is emitted from the polarized double refracted light source 100a.

According to this embodiment, the motor 44 is provided for rotating the body part 71 so that the polarizing light source 70 and the birefringence medium 200, which are installed integrally with each other in the body part 71, are rotated integrally with each other.

The motor 44 is connected to the control part 46 and the control part 46 receives a command of the manipulation part 48. Thus, an operation of the motor 44 is performed according to a manipulation of the manipulation part 48.

Although not shown in the drawings, a mechanical structure may be designed for allowing the motor 44 to rotate only the birefringence medium 200. In this case, the polarizing light source 70 is in a stationary state and one point of the birefringence medium 200 is displaced. According to the present invention, the motor is not necessarily provided as the power source, various means may be provided as the power source and a manual operation is not excluded.

Meanwhile, by utilizing a step motor and the like, the polarization direction of the polarizing light source may be rotated only within a certain angle range, the present invention includes this case as the rotation.

The above polarized double refracted light source 100a emits the light toward the above-mentioned mirror ball 600.

According to the present invention, a plurality of polarized double refracted light sources 100a are provided so that each polarized double refracted light source emits the light toward the mirror ball 600.

According to the third invention, the polarized light emitted from the polarizing light source 70 is double-refracted as it passes through the birefringence medium 200 so that the polarization direction of the light is gradually changed according to the wavelength and the light is illuminated to the polarizing film 67 mounted to the mirror ball 600.

At this time, since the polarization direction of the light emitted from the polarized double refracted light source 100a is rotated, in a stat that each polarization direction which is changed according to each wavelength is again rotated, the light is illuminated to the polarizing film 67 mounted to the mirror ball 600.

In this case, as the light illuminated to the mirror ball 600 passes through the installed polarizing film 67 and then reflected, it has the specific color, on the other hands, this color of the light is changed according to a rotation of the polarization direction of the light emitted from the of the polarized double refracted light source 100a.

If the lights polarized and double-refracted and having the polarization directions which differ from each other according to wavelengths are illuminated to the polarizing film 67 of the mirror ball 600, the light having the polarization direction perpendicular to that of the polarizing film 67 does not pass through the polarizing film, the other light passes partly or fully through the polarizing film according to the polarization angle so that the lights with wavelengths passing through the polarizing film are mixed to create a specific colored-light. At this time, as the polarization direction of the light emitted from the light source is rotated, the polarization direction of the light illuminated to the polarizing film 67 is changed again according to the wavelength, and the wavelength which can pass through the polarizing film 67 and the ratio of the wavelength passing the through the polarizing film are changed. Accordingly, the color of the light reflected on the reflection member 61 is changed.

If the polarization directions differ from each other between the polarizing films 37, the colors of the polarizing films 67 having different polarizations differ from each other. If the polarization directions of a plurality of polarizing films 67 are sequentially changed in order, the colors may be sequentially changed.

The above phenomenon is generated when the polarization direction of the light emitted from the polarizing light source, a location of one point of the birefringence medium and the polarization direction of the polarizing means installed on the mirror 600 are changed relative to each other.

For example, the above phenomenon is also generated in the case where the polarization direction of the light emitted from the polarizing light source and the polarization direction of the polarizing means installed on the mirror 600 are not changed and only the birefringence medium 200 is rotated to change the refraction direction.

According to the third invention, it is possible to change the polarization direction by means of the liquid crystal device.

Figure 16:
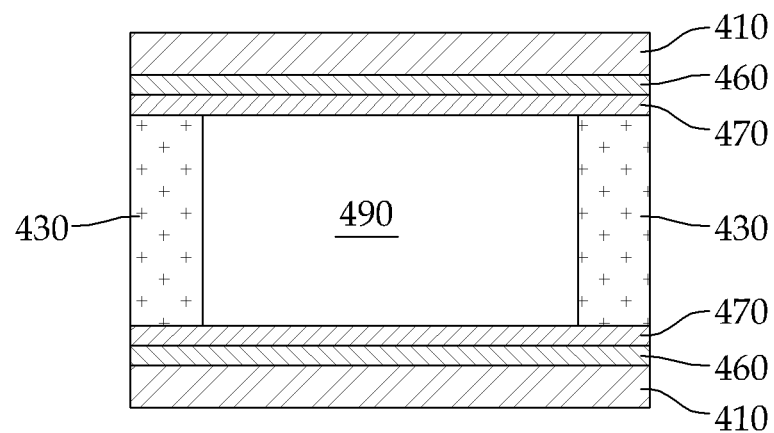
FIG. 16 shows a liquid crystal device for changing the polarization direction of the polarized light source in the third invention.

FIG. 16 shows an example of the above liquid crystal device 400. In the liquid crystal device 400 making a change of the polarization direction, a space (not shown) is interposed between the glass substrates 410 and 410 to secure a space, and the space is filled with liquid crystal 490 and then sealed by the sealant 430. On each lower part of the glass substrates 410 and 410, the transparent electrode 460 and the liquid crystal alignment layer 470 are sequentially laminated.

When a voltage is applied to the transparent electrodes 460 and 460, an arrangement of the liquid crystal 490 is changed according to the strength of voltage so that if the polarized light is transmitted to the glass substrates 410 and 410, the polarization direction of the light is changed as the light passes through the liquid crystal. Substantially, the above structure is the same as that of a LCD panel from which the polarizing plate is removed.

Figure 17:
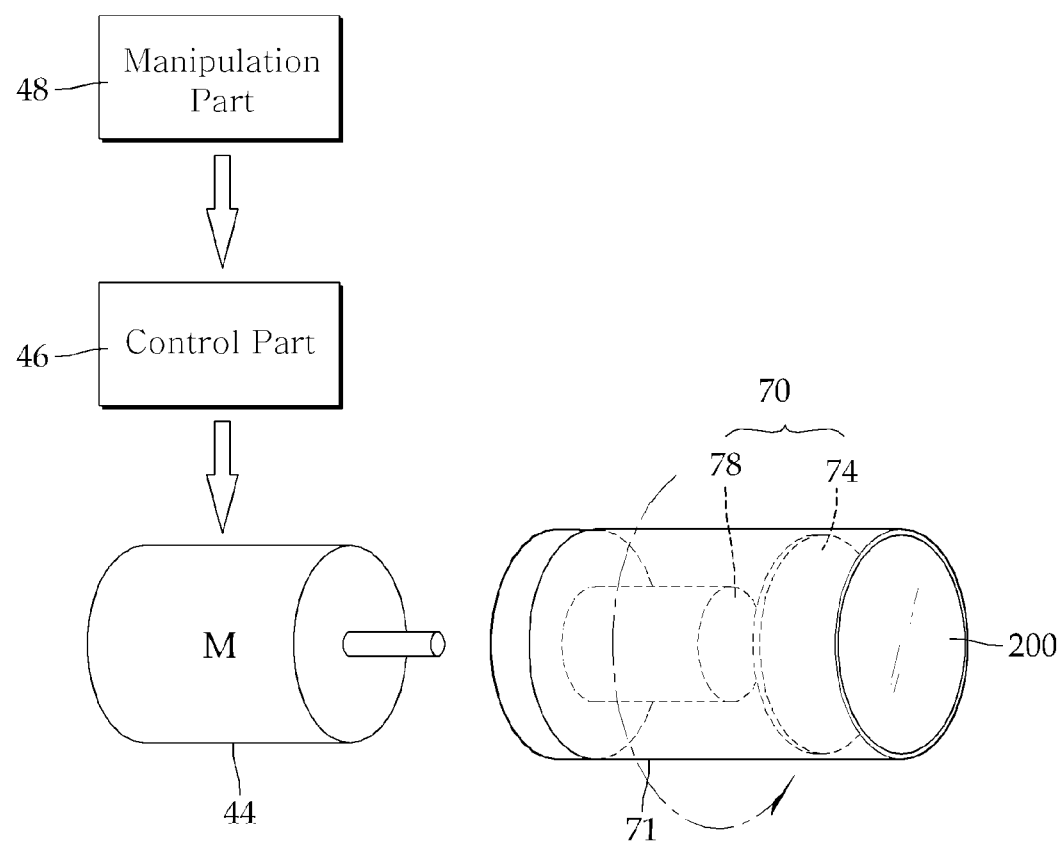
FIG. 17 shows another example of the polarized double refracted light source in the mirror ball illumination system according to the third invention.

FIG. 17 shows one example of a polarized double refracted light source 100b employing the liquid crystal device 400 of FIG. 16.

The light source 78 is provided in the case member 900, the polarizing means 74 such as the polarizing film or the polarizing filter is disposed in front of the light source, the liquid crystal device 400 for rotating the polarization direction is disposed in front of the polarizing means, and the birefringence medium 200 is disposed in front of the liquid crystal device.

By this structure, the light emitted from the light source 78 is polarized as it passes through the polarizing means 74. Then, while the light passes the liquid crystal device 400, the polarization direction of the light is rotated and the light passes the birefringence medium 200. Therefore, the light having the polarization directions which differ from each other and are changed according to the wavelength by changing the strength of voltage applied to the liquid crystal device 400 is emitted.

Figure 18:
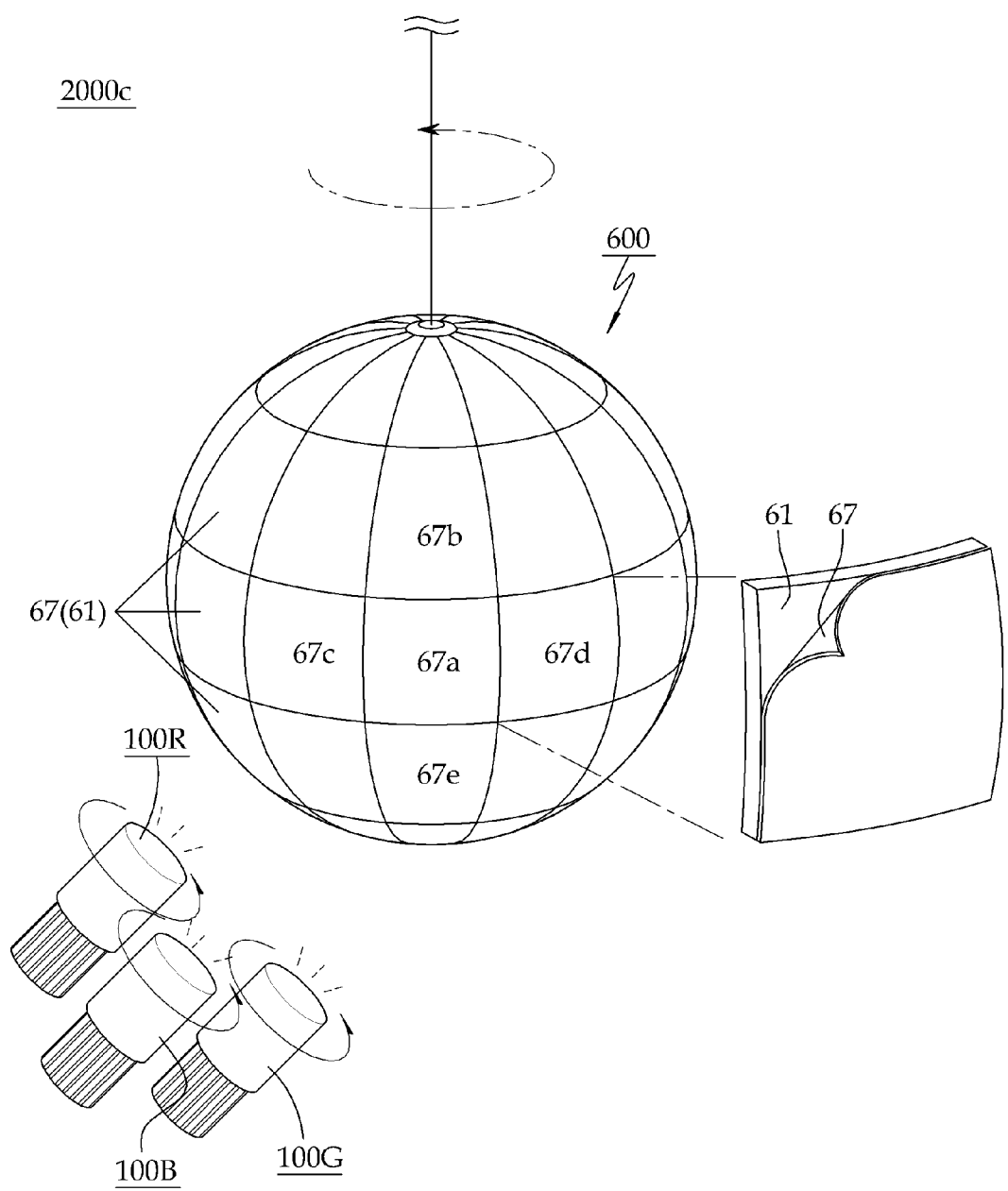
FIG. 18 shows a second embodiment of the mirror ball illumination system according to a third invention.

FIG. 18 shows the mirror ball illumination system according to the second aspect of the third invention.

According to the second aspect of the third invention, instead of the polarized double refracted light source 100a, a plurality of polarizing light sources 100R, 100G and 100B are provided. The plurality of polarizing light sources 100R, 100G and 100B emit the polarized lights, respectively, colors of the lights emitted from the polarizing light sources differ from each other.

These polarizing light sources 100R, 100G and 100B emit the red (R), green (G) and blue (B)-colored lights, respectively, and it is preferable to mix the above lights to form the white-colored light.

Furthermore, according to the second aspect of the third invention, the polarization direction of the light emitted from the polarizing light sources 100R, 100G and 100B and the polarization direction of each polarizing film 68 attached to the mirror ball 600 are relatively changed relative to each other.

Figure 19:
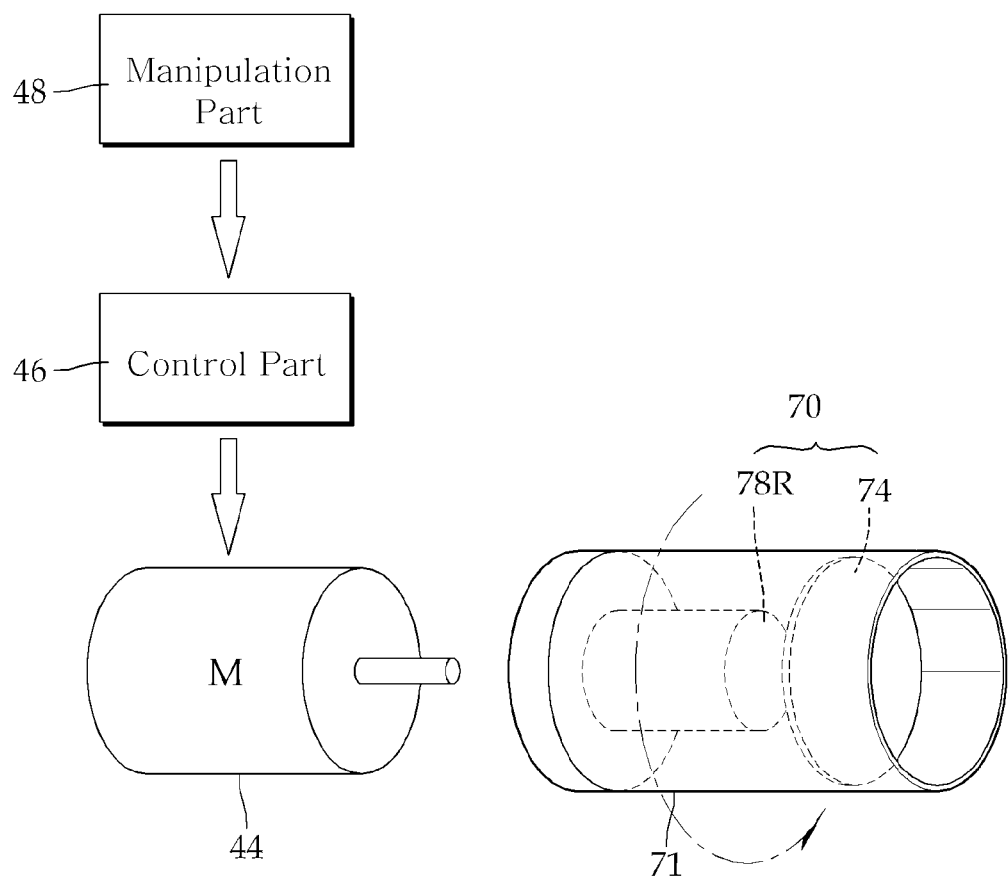
FIG. 19 shows an example of a polarized light source by R, G and B.

In this embodiment, as shown in FIG. 19, the polarizing light source 100R is constructed such that the light source 78R emitting the red-colored light is provided in the body part 71, the polarizing means 74 is installed in front of the light source and the motor 44 is controlled to rotate the body part 71 so that the polarization direction of the red (R)-colored light is rotated. The polarizing light source 100G and the polarizing light source 100B may be constructed in the manner which is the same as that in which the polarizing light source 100R is constructed. In this case, the mirror ball 600 may be in a stationary state, but it doesn't matter that the mirror ball is rotated.

In this case, if the lights having the polarization directions which differ from each other according to R, G and B wavelengths are illuminated to the polarizing film 67 which is the polarizing means of the mirror ball 600, the light having the polarization direction perpendicular to that of the polarizing film 67 does not pass through the polarizing film, the other light passes partly or fully through the polarizing film according to a polarization angle so that the lights with wavelengths passing through the polarizing film are mixed to create a specific colored-light. At this time, the polarization directions of the lights having R, G and B wavelengths and illuminated to the polarizing film 67 are changed again, the wavelength which can pass through the polarizing film 67 and the ratio of the wavelength passing the through the polarizing film are changed. Accordingly, the color of the light reflected on the reflection member 61 is changed. The different colors are changed between the polarizing films 67 having the polarization directions which differ from each other.

FIG. 20 shows R, G and B polarizing light sources 100c emitting the lights having the polarization directions according to R, G and B wavelengths, the polarization direction of each light is rotated.

The R, G and B polarizing light sources 100c comprises a polarizing light source 101 emitting the light with red wavelength, a polarizing light source 102 emitting the light with green wavelength, and a polarizing light source 103 emitting the light with blue wavelength. These polarizing light sources have light sources 60R, 60G and 60B emitting the red-colored, green-colored and blue-colored lights, respectively, the polarizing means 70, 70, 70 are disposed in front of the light sources 60R, 60G and 60B, and the aforementioned liquid crystal devices 400, 400, 4000 are installed in front of the polarizing means.

Accordingly, while the lights with R, G, B wavelengths are emitted, the polarization direction of each of the lights is changed. It is preferable to emit the white-colored light obtained by means of mixing the R, G, B wavelengths.

One R polarizing light source 100c, one G polarizing light source and one B polarizing light source may be provided, or a plurality of R polarizing light sources, a plurality of G polarizing light sources and a plurality of B polarizing light sources may be provided.

According to the present invention, by controlling variously a rotary speed of the motor 44, a change speed of color of the light reflected from the mirror ball 600 may be variously created. In addition, by controlling variously a rotation direction or a rotation angle of the body part 71 through a control of the motor 44, it is possible to variously adjust a creation of color of the light reflected from the mirror ball 600.

In the description regarding the third invention, the mirror ball is described as the reflection object, third invention is not limited thereto, the third invention may be applied to all the reflection objects to which the reflection member such as a mirror is installed.

In the aforementioned embodiment, for example, instead of the mirror ball 600, if the reflection object formed by attaching the polarizing means such as the polarizing film on an upper surface of the reflection member such as a mirror is provided, it is possible to obtain the reflection light whose color is changed on the polarizing film. In this case, a plurality of reflection members may be provided (for example, a base member to which a plurality of mirrors are attached), and one reflection member such as a base member to which one mirror is attached may be provided.

In this case, a plurality of polarizing means may be installed such that the polarizing means are adjacent to or spaced apart from each other on the reflection member. In this case, some or all of the polarization directions of these polarizing means may differ from each other, the polarizing means having different polarization directions create the reflected lights whose colors are differently changed.

Figure 21:
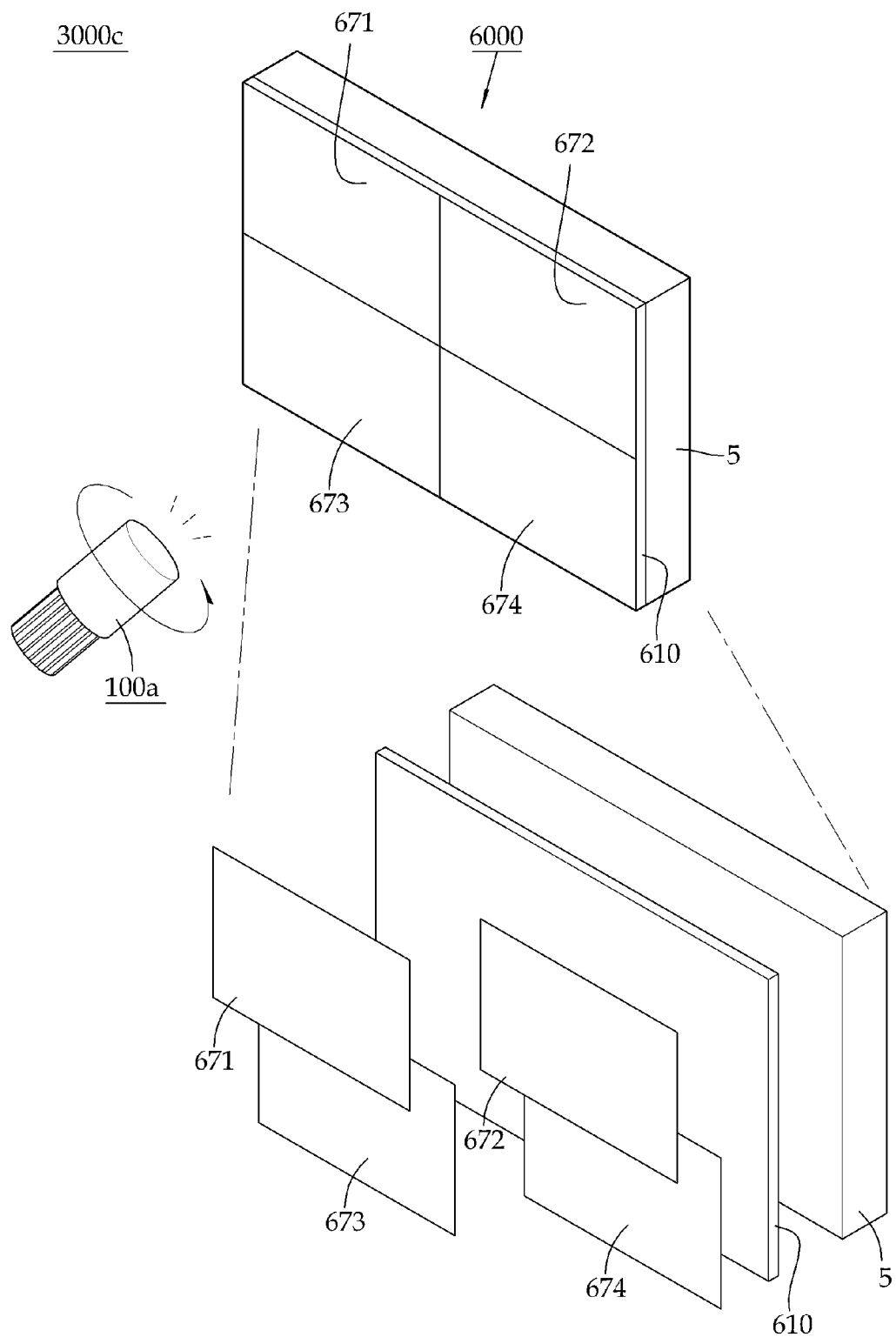
FIG. 21 shows an example where the third invention is applied to a plane reflection object.

For example, FIG. 21 shows a polarizing reflection illumination system 3000c provided with a plane reflection object 6000 instead of the mirror ball 600 shown in FIG. 14.

In the plane reflection object 6000, a reflection member 610 such as a mirror is installed on a front surface of a base member 5, and four polarizing films 671, 672, 673 and 674 acting as the polarizing means are attached to the reflection member 610. Here, the polarization directions of the polarizing films 671, 672, 673 and 674 differ from one another.

The light having the different polarization directions according to the wavelengths wherein the respective polarization directions rotates are emitted from the polarized double refracted light source 100a and illuminated to the reflection object 6000 and the reflected lights present different colors on the polarizing films 671, 672, 673 and 674, respectively, each of color changes in sequence.

Figure 22:
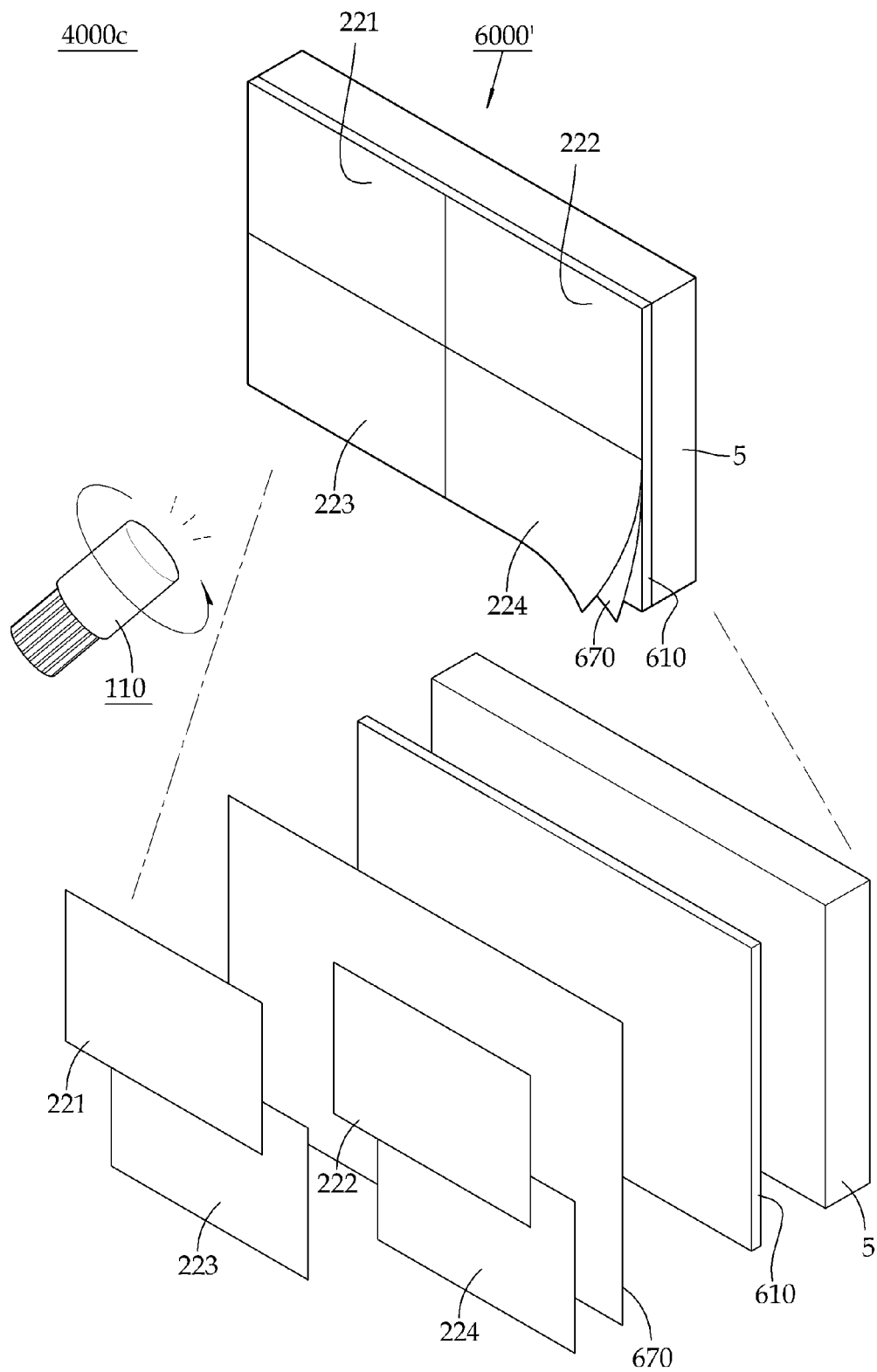
FIG. 22 shows another embodiment according to another aspect of the third invention.

FIG. 22 shows a polarization reflection illumination system 4000c according to another aspect of the third invention.

In this case, a reflection object 6000' has the base member 5, and the reflection member 610 such as a mirror is provided on a front surface of the base member. A polarizing means 670 such as a polarizing film is provided on a front surface of the reflection member 610. In this embodiment, one polarizing means 670 is provided. However, a plurality of polarizing means may be provided and some of polarizing means may have the polarization direction which differs from that of the remaining polarizing means or the polarization direction of all the polarizing means may differ from each other.

The birefringence medium is provided on a front surface of the polarizing means 670, this birefringence medium is divided into a plurality of zones 221, 222, 223 and 224, a birefringence characteristics of which differ from each other.

If the different birefringence medium is used or if the thickness or the arrangement direction of the same birefringence medium is different (for example, in a case where the birefringence medium is placed in the horizontal direction or in the vertical direction), the birefringence characteristic may be changed.

With regard to the case where the birefringence characteristics differ from zone to zone due to different materials utilized for forming the birefringence medium, by utilizing the different materials for forming the birefringence medium on the zones 221, 222, 223 and 224, respectively, the birefringence characteristics of the zones may differ from each other (for example, one material is cellophane film, the other is OPP film).

With regard to the case where the birefringence characteristics of the zones differ from each other due to a difference between thicknesses of the birefringence medium in the zones, the birefringence characteristics of the zones may differ from each other by adjusting the number of layers of the films having the same thickness.

In the double-refracted zones 221, 222, 223 and 224 shown in FIG. 22, the number of layers of films may differ from zone to zone.

In addition, if the arrangement directions of the birefringence media differ from each other, the different birefringence characteristics may be obtained although the same birefringence media are employed. Although the same birefringence media are removed from the zones 221, 222, 223 and 224, if the arrangement directions of the removed birefringence media differ from each other, the zones have the birefringence characteristics which differ from each other (for example, in a case where one is attached in the longitudinal direction and the other one is attached in the transverse direction).

The polarized light emitted from the polarizing light source 70 is illuminated to a reflection object 6000'. In addition, according to the present invention, a displacement means for displacing relative to each other the polarization direction of the light emitted from the polarizing light source 70 and a location of one point of the birefringence media 221, 222, 223 and 224 of the refection object 6000' is provided. In this embodiment, the polarizing light source 70 is rotated by a rotational force of the motor so that the displacement means comprises the motor.

In the polarization reflection illumination system 4000c as described above, the light emitted from the polarizing light source 70 is illuminated to the zones 221, 222, 223 and 224 having the birefringence characteristics which differ from each other. Since the zones have the birefringence characteristics which differ from each other, the light passed through the zones have the different polarization directions according to the wavelengths.

The lights having the polarization directions which differ from each other according to the wavelength on every zone are illuminated to the polarizing means 670, the light having the polarization direction perpendicular to that of the polarizing means 670 does not pass through the polarizing means, the other light passes partly or fully through the polarizing film according to a polarization angle so that the lights with wavelengths passing through the polarizing means are mixed to create a specific colored-light on each zone.

At this time, as the polarization direction of the light emitted from the polarizing light source 70 is rotated, the polarization direction of the wavelength of the light illuminated to the polarizing means 670 is changed again, the wavelength which can pass through the polarizing means 670 and the ratio of the wavelength passing the through the polarizing means are changed so that the color of the light reflected on the reflection member 610 is changed on every double-refraction zone 221, 222, 223 and 224.

Figure 23:
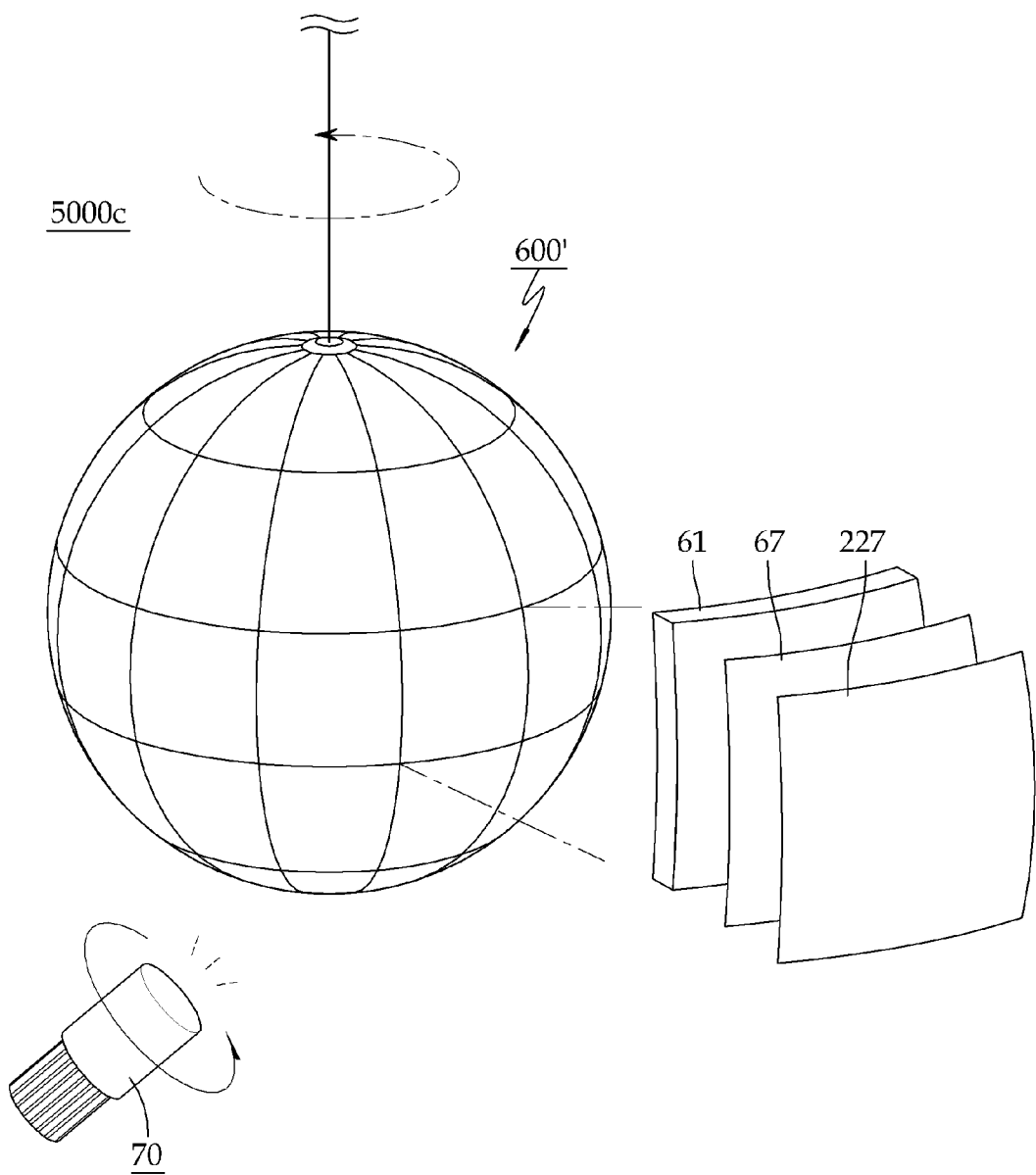
FIG. 23 shows an example where the plane reflection object is the mirror ball in the embodiment shown in FIG. 22.

FIG. 23 shows an example where the reflection object is the mirror ball 600' in the embodiment shown in FIG. 22.

A plurality of reflection members 61 are provided on a surface of the mirror ball 600' the polarizing film 67 is attached to an upper surface of each of the reflection member, and a birefringence film 227 is attached to a surface of the polarizing film 67. Some or all of the birefringence films 227 may have different birefringence characteristics, and it is preferable that at least adjacent birefringence films have different birefringence characteristics.

In this embodiment, the mirror ball 600' which is the reflection object is rotated and the polarizing light source 70 is rotated by the displacement means such as the motor so that a rotation of its polarization direction is changed.

In this case, the different color is reflected on every birefringence zone 227 and the color is changed.

The third invention provides the polarized reflection illumination system in which the color of the reflected light of the reflection object such as the mirror ball is changed by means of the polarization phenomenon and, in particular, the color of each reflected light is changed into different color according to the polarization direction of the polarizing means on a surface of the reflection object or the birefringence characteristic of the birefringence medium.

According to the third invention, even though the color of the light emitted from the light source is not changed, the color of the reflected light of the reflection object such as the mirror ball is changed.

FIGS. 24 to 31 illustrate a polarization illumination system according to the fourth invention of the present patent application.

In the illumination device such as a chandelier hung with ornamental objects, the fourth invention makes the ornamental object create various color changes by means of the light source of the lamination device the polarized light.

Figure 24:
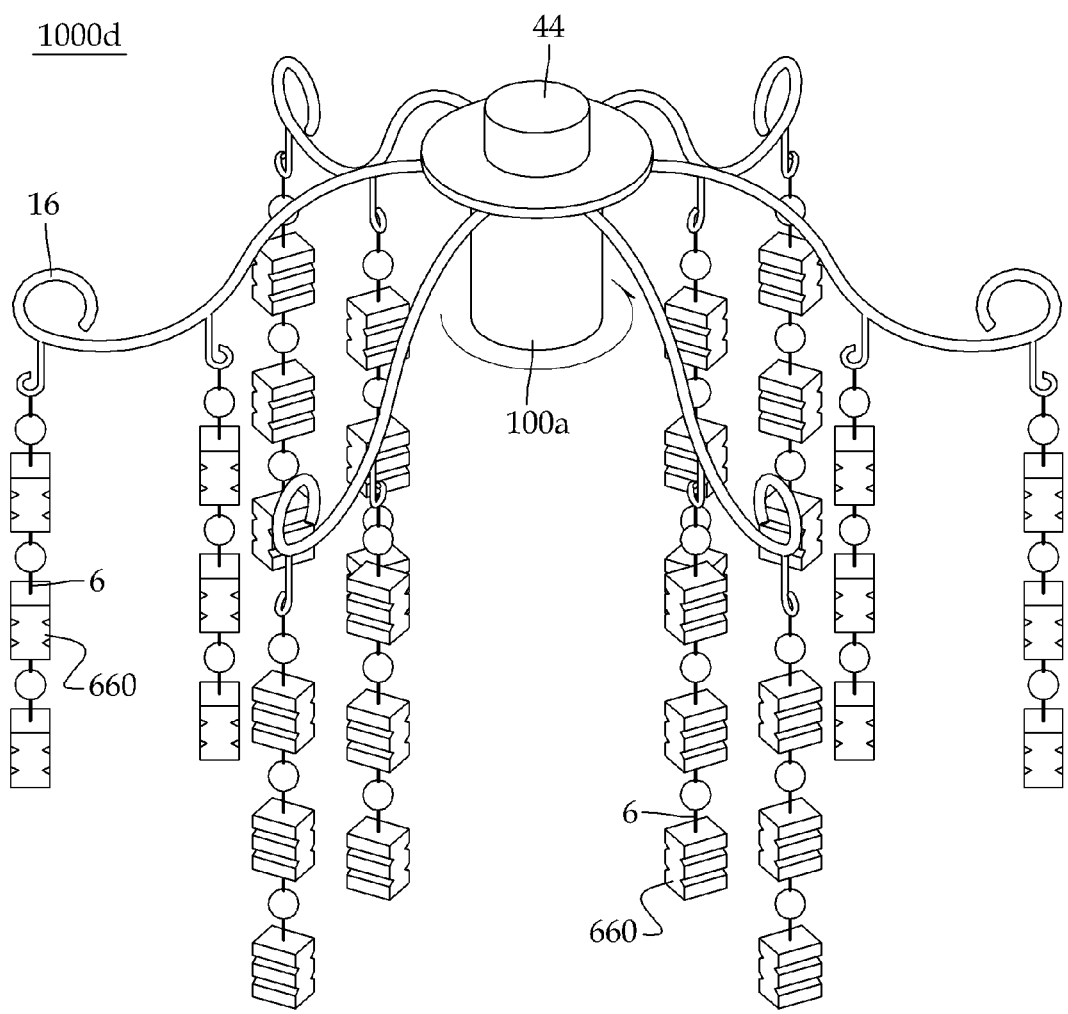
FIG. 24 shows a polarization illumination device according to a first embodiment of a fourth invention.

FIG. 24 shows one embodiment 1000d of the polarization illumination device according to the fourth invention, the polarization illumination device 1000d is a chandelier to which a plurality of ornamental objects 660.

The ornamental object 660 is a medium through which the light passes. For example, the ornamental object is formed of crystal or glass. However, the present invention is not limited thereto, the ornamental object may be formed of plastic or various materials through which the light passes.

According to the present invention, the polarizing means such as the polarizing film, the polarizing filter or the polarizing plate is mounted to the ornamental object 660 to illuminate the light, which is emitted from the polarizing light source, to the polarizing means. The above structure will be described later.

Figure 26:
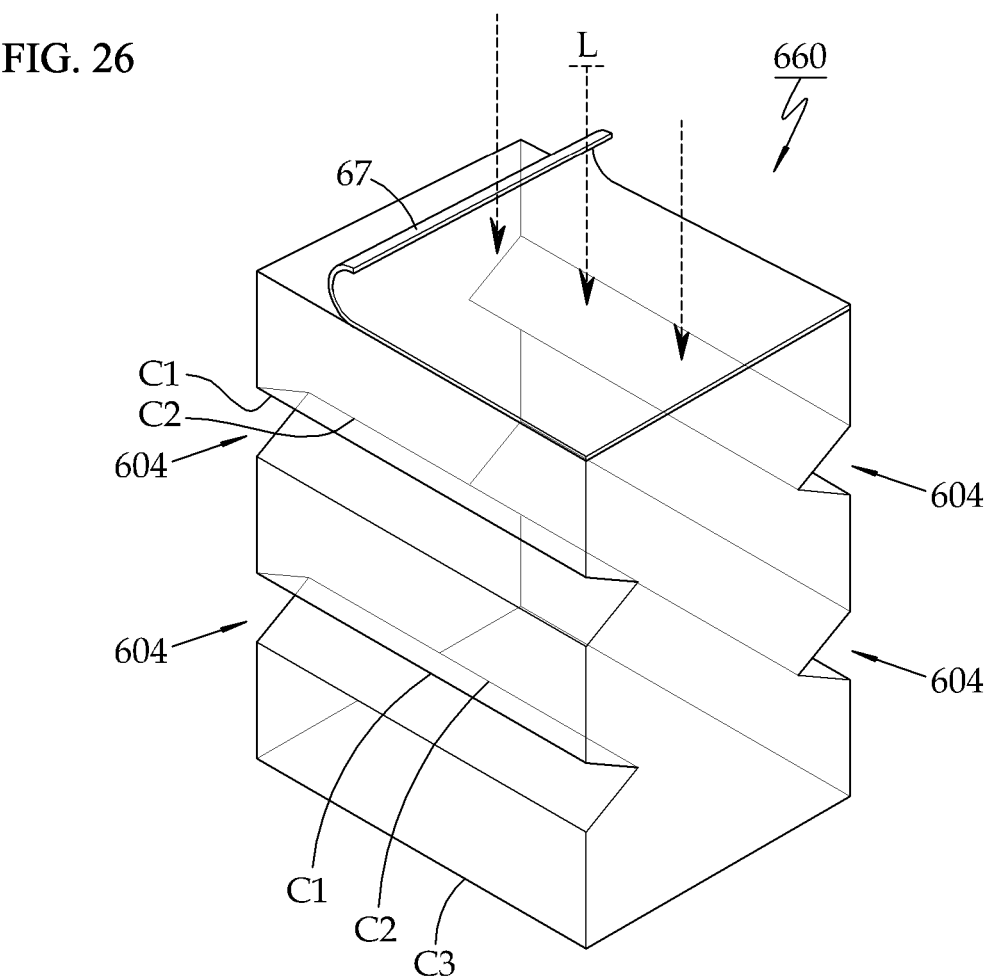
FIG. 26 shows a portion where color change occurs in the ornamental object on which the effect of the fourth invention is presented.

Referring to FIGS. 24 and 26, in this embodiment, the ornamental objects 660 are suspended from ornament frames 16 around a main body of the chandelier through strings 6, the ornamental object 660 has a hexahedron shape and the polarizing film 67 acting as the polarizing means is attached to an upper surface of the ornamental object 660.

By this, the light emitted from the polarizing light source 70 is illuminated to the polarizing film 67 provided on the ornamental object 660.

Figure 25:
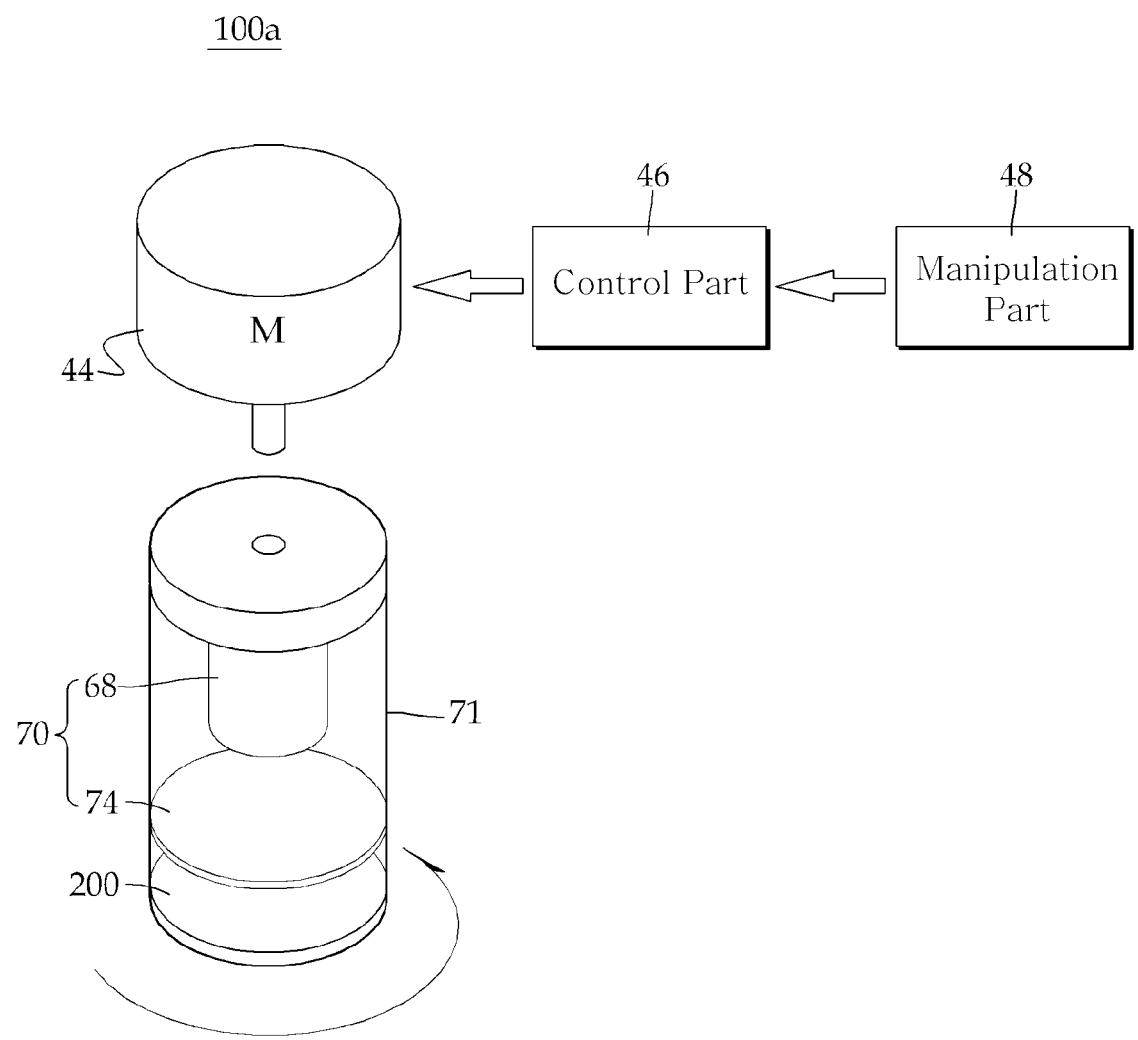
FIG. 25 shows the polarized double refracted light source according to the first embodiment of the fourth invention.

Referring to FIG. 24, the polarized double refracted light source 100a polarizing, double-refracting and emitting the light is provided, and the polarizing light source 70 is installed in the polarized double refracted light source 100a (see FIG. 25). The above structure is illustrated later.

According to the fourth invention, it is preferable to form a relief or an intaglio on the ornamental object 660. In this case, the color in the relief or the intaglio may be remarkably come into sight.

On the other hands, instead of a relief or an intaglio, a bubble or an empty space may be formed in the ornamental object 660 to emphasize the color at a boundary interface of the bubble or empty space.

In addition, the polyhedral body having a plurality of edges formed by intricate lines is utilized as the ornamental object 660 so that the color on each edge of the ornamental body may be emphasized.

However, although the ornamental object 660 does not include a relief or an intaglio, a bubble or an empty space and does not have an intricate polyhedral structure, the color change function according to the present invention may be obtained so that the above elements are not essential to the present invention.

According to the present embodiment, the ornamental object 660 has a V-sectional shaped grooves 604 and 604 (see FIG. 26).

According to the present invention, the polarizing illumination device 1000*d* is not limited to the chandelier, and includes all the illumination devices having the ornamental object.

According to the present invention, the polarizing illumination device 1000*d* has the polarizing light source 70 emitting the polarized light.

For example, a device in which the polarizing means such as the polarizing film, the polarizing plate or the polarizing filter is attached to the light source to allow the light emitted from the light source to be polarized as it passes through the polarizing means such as the polarizing film, the polarizing plate or the polarizing filter, and to be illuminated, may be provided as the polarizing light source 70.

In addition, according to the present invention, the birefringence medium 200 is provided, this birefringence medium is disposed between the polarizing light source 70 and the polarizing means installed on the ornamental object 660 so that the light emitted from the polarizing light source 70 passes through the birefringence medium 200 and is then illuminated to the polarizing means (the polarizing film 67 in this embodiment) installed on the ornamental object 660.

The birefringence medium 200 may be disposed at various locations between the polarizing light source 70 and the ornamental object 660. The birefringence medium may be disposed independently of the polarizing light source 70 and the ornamental object 660 between the polarizing light source and ornamental object, or the film type birefringence medium may be attached to the polarizing means 74 of the polarizing light source 70 or a surface of the polarizing film 67, which is the polarizing means, at the ornamental object 660.

An extendible plastic film such as OPP film and PET film having the birefringence property, or a cellophane film, a plastic plate may employed as the film type birefringence medium, and a birefringence film manufactured specially only for the birefringence may be utilized as the film type birefringence medium. A birefringence plate, a birefringence lens and the like may be employed as the birefringence medium.

According to the fourth invention, the polarization direction of the light emitted from the polarizing light source 70, a location of one point of the birefringence medium 200 and the polarization direction of the polarizing means 67 provided on the ornamental object 660 are changed relative to each other. The above relative change may include the below occasions.

At this time, a change of location of one point of the birefringence medium means that a location of one random point on the birefringence medium is changed, and includes that a point on an axis of rotation is not changed and a location of random point at another place is changed if the birefringence medium is rotated.

Firstly, the polarization direction of the light emitted from the polarizing light source 70 and the birefringence medium 200 are rotated relative to each other and the polarizing means 67 installed on the ornamental object 660 is in a stationary state. If the polarizing means 67 is fixed to the ornamental object 660, when the ornamental object 660 is in a stationary state, the polarizing means 67 is also in a stationary state. Meanwhile, if the polarizing means 67 is fixed to the ornamental object 660, the polarizing means 67 will be displaced according to a displacement (movement) of the ornamental object 660.

This includes a case in which one of the polarizing light source 70 and the birefringence medium 200 is in a stationary state and the other is rotated and a case in which both of the polarizing light source and the birefringence medium 70 and 200 are rotated and their rotation speeds differ from each other.

Secondly, the polarizing light source 70 is in a stationary state, and a point of the birefringence medium 200 and one point of the polarizing means 67 provided on the ornamental object 660 are displaced relative to each other. For example, this may include a case in which the birefringence medium 200 is rotated, a case in which the ornamental object 660 is rotated by a rotation of the string 6 of the ornamental object 660 to which the polarizing film 67 is attached, or a case in which the ornament frame 16 to which the ornamental frame 660 is installed is revolved around the main body of the chandelier.

Thirdly, the birefringence medium 200 is in a stationary state, and the polarization direction of the light emitted from the polarizing light source 70 and the polarization direction of the polarizing means 67 provided on the ornamental object 660 are changed relative to each other. This also may include a case in which one of the polarizing light source 70 and the polarizing means provided on the ornamental object 660 is in a stationary state and the other is rotated or revolved.

Fourthly, all the polarizing light source 70, the birefringence medium and the polarizing means 67 installed on the ornamental object 660 are displaced.

Fifthly, the polarizing light source 70 is displaced integrally with the birefringence medium 200 or the polarizing light source and the birefringence medium are identically displaced at the same speed, and the polarizing means 67 installed on the ornamental object 660 is in a stationary state.

Sixthly, the polarizing light source 70 is in a stationary state, and the birefringence medium 200 is displaced integrally with the polarizing means 67 installed on the ornamental object 660 or the birefringence medium and the polarizing means are identically displaced at the same speed.

According to the present invention, the above rotation includes a rotation within a range of a certain angle or a change of angle. For example, the above rotation includes a change of angle such as 30°, 60°, 90° or 180°.

In the embodiment of FIG. 24, the 8, the polarized double refracted light source 100*a* is provided. In this case, the polarizing light source 70 and the birefringence medium 200 are rotated integrally with each other and the polarizing film 67 attached to the ornamental object 660 is in a stationary state. A case in which the ornamental object 660 is moved by a wind is not excluded in the above case.

FIG. 25 shows a structure of the polarized double refracted light source 100a of FIG. 24, the polarized double refracted light source 100a has the body part 71. The light source 68 is installed in the body part 71, and the polarizing means 74 such as the polarizing filter or the polarizing film is provided in front of the light source. Due to the above, the light of the light source 68 passes through the polarizing means 74 and is polarized, the light source 68 and the polarizing means form the polarizing light source 70 emitting the polarized light.

In the body part 71, the birefringence medium 200 is installed in front of the polarizing means 74. Thus, the light, which was emitted from the light source 68, passed through the polarizing means 74 and is then polarized, is double-refracted at it passes the birefringence medium 22, and the light having the different polarization direction according to the wavelength is emitted from the polarized double refracted light source 100a.

According to this embodiment, the motor is provided to rotate the body part 71 so that the polarizing light source 70 and the birefringence medium 200 installed integrally to the body part 71 are rotated together and displaced relative to each other.

The motor 44 is connected to the control part 46, and the control part 46 receives a command of the manipulation part 48. Due to the above, the motor 44 is operated according to a manipulation of the manipulation part 48.

Although not shown in the drawings, a mechanical structure may be designed for allowing the motor 44 to rotate only the birefringence medium 200. This case corresponds to a case in which the polarizing light source 70 is in a stationary state and one point of the birefringence medium 200 is displaced.

According to the fourth invention, the motor is not necessarily provided as the power source, various means may be provided as the power source and a manual operation is not excluded.

Such polarized double refracted light source 100a emits the light, at this time, the light emitted from the polarized double refracted light source 100a is illuminated to the polarizing film 67 which is the polarizing means installed on the ornamental object 660. One polarized double refracted light source 100a may be provided and a plurality of the polarized double refracted light source may be provided.

Light source 70 is double-refracted as it passes through the birefringence medium 200 so that the polarization direction of the light is changed according to the wavelength and the light is illuminated to the polarizing film 67 mounted to the ornamental object 660.

At this time, since the polarization direction of the light emitted from the polarized double refracted light source 100a is rotated, in a state where each polarization direction changed according to each wavelength is again rotated, the light is illuminated to the polarizing film 67 installed to the ornamental object 660.

In this case, referring to FIG. 26, the light illuminated to the ornamental object 660 has a specific color as it passes through the polarizing film 67 installed to the ornamental object, this specific color is strongly appeared on edges C1, C2 and C3 of the ornamental objects, which are on a travelling path of the light passed through the polarizing film 67. On the other hand, the above appeared color is changed according to a rotation of the polarization direction of the light emitted form from the polarized double refracted light source 100a.

If the polarized lights which are double-refracted and have the polarization directions which differ from each other according to wavelengths are illuminated to the polarizing means 67 of the ornamental object 660, the light having the polarization direction perpendicular to that of the polarizing means 67 does not pass through the polarizing means, the other light passes partly or fully through the polarizing film according to a polarization angle so that the lights with wavelengths passing through the polarizing means are mixed to create a specific colored-light. This color is strongly appeared in the edges C1, C2 and C3 as an optical effect such as a reflection.

However, the polarization directions of the lights having wavelengths and illuminated to the polarizing film 67 are changed again, the wavelength which can pass through the polarizing film 67 and the ratio of the wavelength passing the through the polarizing film are changed. Accordingly, the color appeared on the ornamental object 660 is changed.

The above phenomenon is generated when the polarization direction of the light emitted from the polarizing light source 70, a location of one point of the birefringence medium 200 and the polarization direction of the polarizing means 67 installed on the ornamental object mirror 660 are changed relative to each other.

For example, the above phenomenon is also generated in the case where the polarization direction of the light emitted from the polarizing light source and the polarization direction of the polarizing means installed on the ornamental object are not changed and only the birefringence medium 200 is rotated to change the refraction direction.

Figure 27:
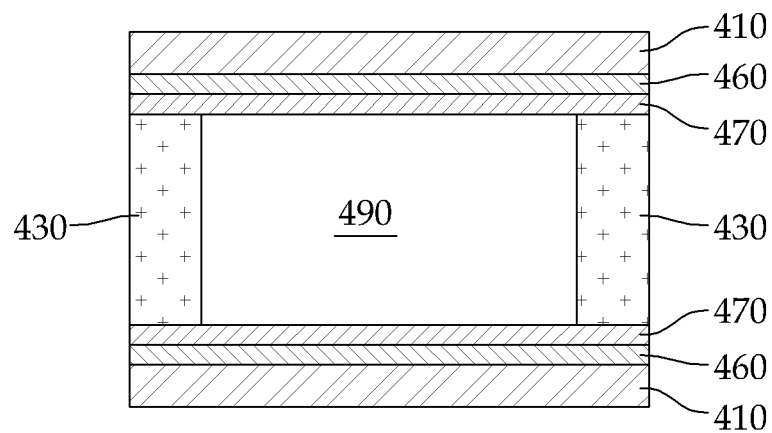
FIG. 27 shows a structure of the liquid crystal device that rotates the polarization direction of the polarized light source in the fourth invention.

According to the present invention, it is possible to change the polarization direction by means of the liquid crystal device. FIG. 27 shows an example of the liquid crystal device 400 as described above. In the liquid crystal device 400 making a change of the polarization direction, a space (not shown) is interposed between opposite glass substrates 410 and 410 to secure a space, and liquid crystal 490 is filled in the space and the space is sealed by a sealant 430. On each lower part of the glass substrates 410 and 410, the transparent electrode 460 and the liquid crystal alignment layer 470 are sequentially laminated.

When a voltage is applied to the transparent electrodes 460 and 460, an arrangement of the liquid crystal 490 is changed so that if the polarized light is transmitted to the glass substrates 410 and 410, the polarization direction of the light is changed as the light passes through the liquid crystal. Substantially, the above structure is the same as that of a LCD panel from which the polarizing plate is removed.

Figure 28:
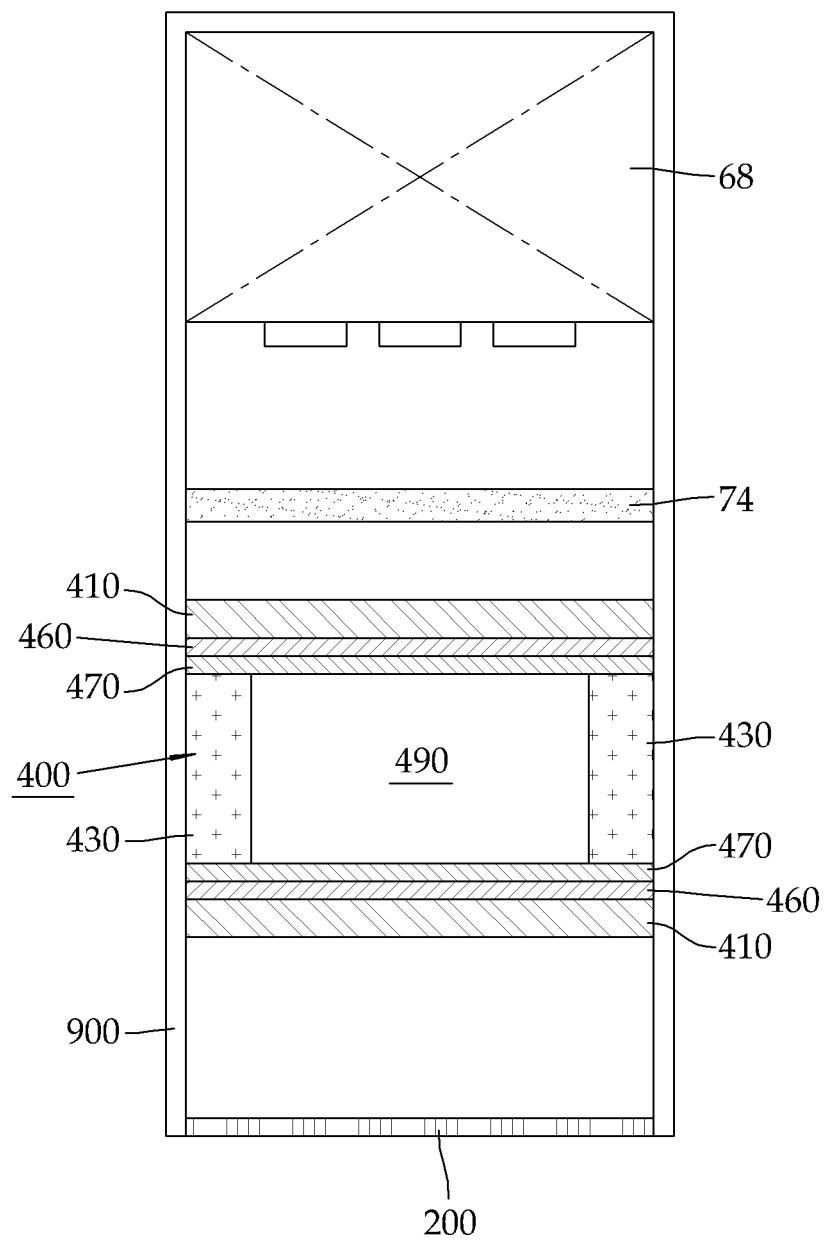
FIG. 28 shows the polarized double refracted light source according to the second embodiment of the fourth invention.

FIG. 28 shows one example of the polarization-birefringence light source 100b employing the liquid crystal device 400 of FIG. 27.

The light source 78 is provided in the case member 900, the polarizing means 74 such as the polarizing film or the polarizing filter is disposed in front of the light source, the liquid crystal device 400 for rotating the polarization direction is disposed in front of the polarizing means, and the birefringence medium 200 is disposed in front of the liquid crystal device.

By the above structure, the light emitted from the light source 68 is polarized as it passes through the polarizing means 74. Then, while the light passes the liquid crystal device 400, the polarization direction of the light is rotated and the light passes the birefringence medium 200. Therefore, the light having the polarization directions which differ from each other and are changed according to the wavelength is emitted.

Figure 29:
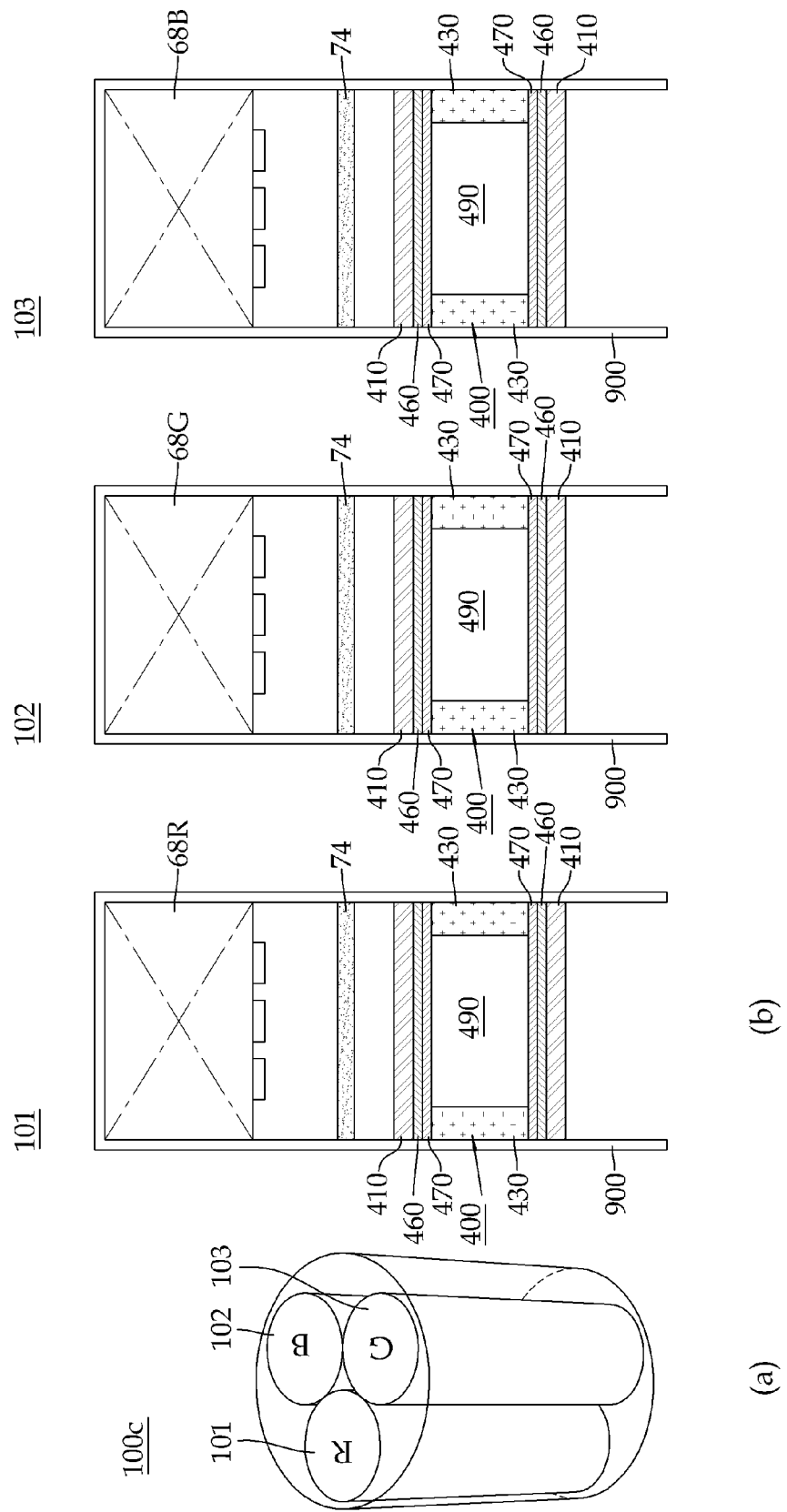
FIG. 29 shows an example of a polarized light source by R, G and B according to the third embodiment of the fourth invention.

FIG. 29 shows the polarizing light sources 100c of R, G and B emitting the lights having the polarization directions which are different according to R, G and B wavelengths and are rotated.

The polarizing light sources 100c of R, G and B comprise a polarizing light source 101 emitting the light of red-colored wavelength, a polarizing light source 102 emitting the light of green-colored wavelength, and a polarizing light source 103 emitting the light of blue-colored wavelength, these polarizing light sources have light sources 68R, 68G and 68B emitting the red-colored light, the green-colored light and the blue-colored light, respectively. The polarizing means 74, 74, 74 are disposed in front of the light sources 68R, 68G and 68B, and the liquid crystal devices 400, 400, 400 are disposed in front of the polarizing means.

As a result, from the liquid crystal devices, the lights of R, G and B wavelengths, whose the polarization directions are changed, it is preferable that the lights of R, G and B are mixed to produce the white-colored light.

Accordingly, the white-colored light is emitted from the chandelier so that the illumination is not influence, but the colors of the ornamental objects 660 are changed. In another case, according to mixing ratio, another colored-light rather than the white-colored light may be emitted and utilized as the illuminating light.

If the lights having the polarization directions which differ from each other according to R, G and B wavelengths are illuminated to the polarizing film 67 which is the polarizing means of the ornamental object 660, the light having the polarization direction perpendicular to that of the polarizing means 67 does not pass through the polarizing film 67, the other light passes partly or fully through the polarizing film according to a polarization angle so that the lights with wavelengths passing through the polarizing film are mixed to create a specific colored-light. This color is strongly appeared in the edges C1, C2 and C3 as an optical effect such as a reflection.

However, the polarization directions of the lights having wavelengths and illuminated to the polarizing film 67 are changed again, the wavelength which can pass through the polarizing film 67 and the ratio of the wavelength passing the through the polarizing film are changed. Accordingly, the color appeared on the ornamental object 660 is changed.

In the illumination device, one R polarizing light source 100c, one G polarizing light source and one B polarizing light source may be provided, or a plurality of R polarizing light sources, a plurality of G polarizing light sources and a plurality of B polarizing light sources may be provided.

Figure 30:
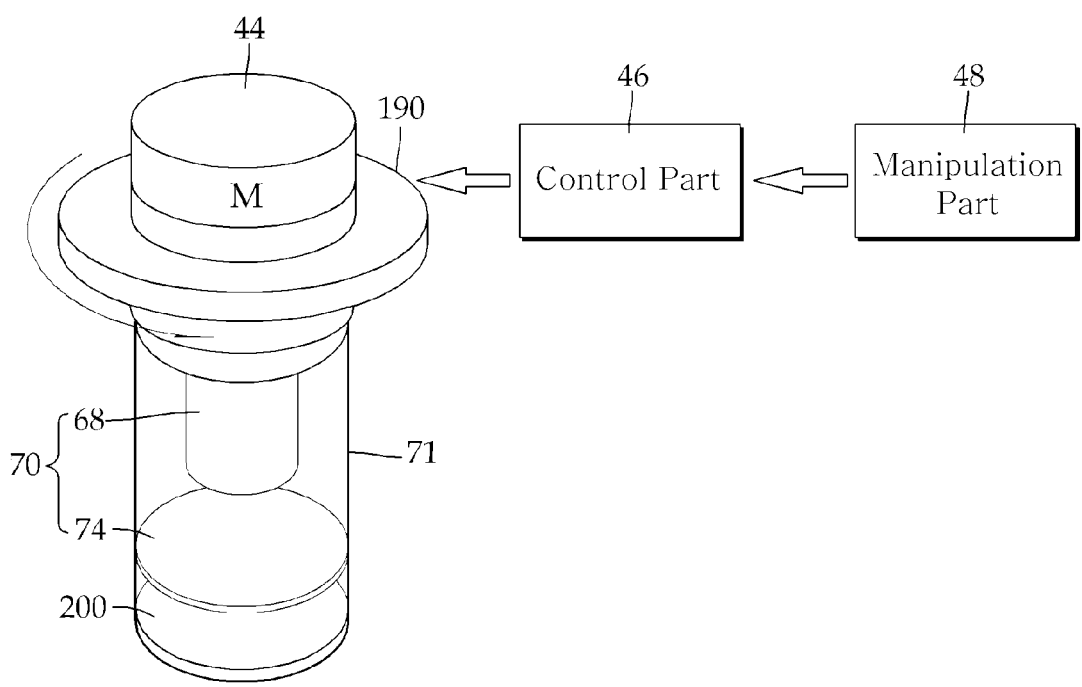
FIG. 30 shows a polarized illumination device according to a fourth embodiment of the fourth invention.
Figure 31:
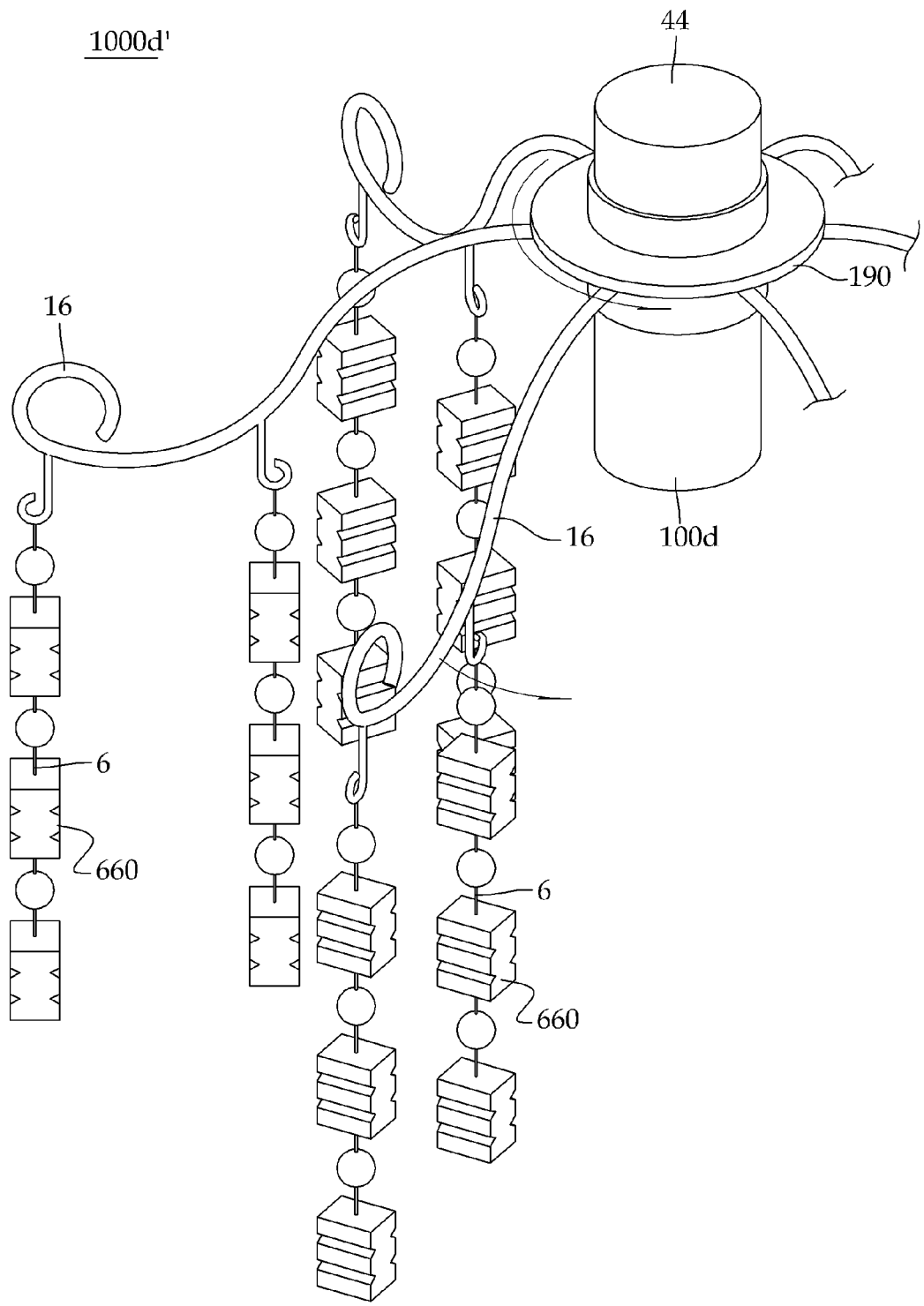
FIG. 31 shows displacement means for displacing an ornamental object in the fourth embodiment of the fourth invention.

FIGS. 30 and 31 illustrate another embodiment 1000d of the polarization illumination device according to the fourth invention.

In this case, a polarized double refracted light source 100d consists of the body part 71, the light source 68, the polarizing means 74 in the body part and the birefringence medium 200.

In this embodiment, the body part 71 is in a stationary state, and the ornamental object 660 is displaced to displace the polarizing film 67, the ornament deck frame on which the ornamental object 660 is placed is rotated according to a power of the motor 44.

A base plate 190 on which the ornament frame 16 is installed is rotated according to an operation of the motor 44 so that the ornamental objects 660 are rotated. At this time, the body part 71 is installed such that the body part is not rotated, but is in a stationary state.

As described above, in this case, the light having the polarization directions which differ from each other according to the wavelengths is illuminated to the polarizing film 67 of the ornamental objects 660. Due to a change of a location of the ornamental objects 660, the relative polarization direction of the polarizing film 67 is changed relative to the polarized double refracted light source 100d, so that the wavelength passing through the polarizing film 67 is changed to change the color appeared on the ornamental objects 660.

As illustrated, the fourth invention provides the polarization illumination device utilizing a polarization effect to change the color of the ornament object in the illumination device to which the ornamental object is suspended.

According to the fourth invention, even though the color of the light emitted from the light source is not changed, the color on the ornamental object is changed.

The polarization illumination system may be employed for displaying or advertising the products with the illumination and may be utilized for decorating an interior design or improving a beauty of building.

What is claimed is:

1. A polarization illumination system comprising:
   (a) light source means;
   (b) polarizing means for polarizing a light emitted from the light source means; (c) a birefringence medium for double refracting the light emitted from the light source means and transmitted through the polarizing means;
   (d) a polarized reflection object that reflects an incident light in a way that the reflected light partly or fully polarized to which the light emitted from the light source means and transmitted through the polarizing means and the birefringence medium is incident.

2. The polarization illumination system as claimed in claim 1 wherein the birefringence medium is attached to the front surface of the polarizing means.

3. The polarization illumination system as claimed in claim 1 wherein the polarizing means has a plurality of polarizing zones wherein polarization directions of the polarizing zones are different.

4. The polarization illumination system as claimed in claim 1 wherein the birefringence medium has a plurality of birefringence zones wherein birefringence characteristics of the birefringence medium are different.

5. The polarization illumination system as claimed in claim 1 wherein the polarized reflection object is made of liquid, glass, acryl, crystal or plastic.

6. An illumination means for illuminating a polarized reflection object that reflects light in a way that the reflected light is fully or partly polarized comprising:
   (a) light source means;
   (b) polarizing means for polarizing light emitted from the light source means;
   (c) a birefringence medium for double refracting the light emitted from the light source means and transmitted through the polarizing means.

7. A polarization illumination system comprising:
   (a) illumination means having a plurality of light sources each emitting different colored light and a plurality of polarizing means each provided in the respective light sources; wherein polarization directions of the plural polarizing means provided in the respective light sources are different, respectively,
   (b) a polarized reflection object that reflects an incident light in a way that the reflected light partly or fully polarized to which the light emitted from the illumination means is incident.

8. The polarization illumination system as claimed in claim 7 wherein the illumination means has a plurality of zones where polarization directions of the plural polarizing means of the light sources emitting the same colored lights are the same in the same zone and are different in the another zone.

9. An illumination means for illuminating a polarized reflection object provided in an illumination space which reflects light in a way that the reflected light is polarized comprising:
  (a) a plurality of light sources each emitting different colored light;
  (b) a plurality of polarizing means each provided in the respective light sources wherein polarization directions of the plural polarizing means provided in the respective light sources are different.

10. The illumination means as claimed in claim 9 wherein the illumination means has a plurality of zones where polarization directions of the polarizing means of the light sources emitting the same colored lights are the same in the same zone and are different in the another zone.

11. An illumination means for illuminating an illumination object having a polarized reflection object provided in an illumination space which reflects light in a way that the reflected light is fully or partly polarized and a birefringence medium arranged on the polarized reflection object comprising:
  (a) light sources means; and
  (b) polarizing means for polarizing light emitted from the light source.

12. A polarization illumination device for illuminating a polarized reflection object that reflects incident light in a way that the reflected light is fully or partly polarized comprising:
  (a) a polarized light source emitting a polarized light to illuminate the polarized reflection object;
  (b) a birefringence medium arranged between the polarized light source and the polarized reflection object, wherein:
  a polarization direction of the light emitted from the polarized light source, the birefringence medium and the polarized reflection objects rotate relative to one another.

13. A polarization illumination device for illuminating a polarized reflection object that reflects an incident light in a way that the reflected light is fully or partly polarized comprising:
  three polarized light sources each emitting red(R), green (G) and blue(B), respectively, wherein:
  the lights emitted from the three polarized light sources are mixed to produce a white light and the produced white light is illuminated to the polarized reflection object; and
  a part or all of the polarization directions of the three polarized light sources and the polarized reflection object rotate relative to one another.

* * * * *